US008509862B2

(12) United States Patent
Jin et al.

(10) Patent No.: US 8,509,862 B2
(45) Date of Patent: Aug. 13, 2013

(54) ROTATION HINGE APPARATUS FOR A PORTABLE TERMINAL, DUAL HINGE APPARATUS HAVING THE SAME, SWING-TYPE PORTABLE TERMINAL, AND SLIDING/ROTATION-TYPE PORTABLE TERMINAL

(75) Inventors: Jae-Chul Jin, Suwon-si (KR); Ki-Taek Kim, Yongin-si (KR); Jin-Soo Kim, Suwon-si (KR); Young-Ki Kim, Yongin-si (KR); Jun-Hyung Kim, Seoul (KR); Seung-Jae Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1358 days.

(21) Appl. No.: 12/017,907

(22) Filed: Jan. 22, 2008

(65) Prior Publication Data
US 2008/0176607 A1    Jul. 24, 2008

(30) Foreign Application Priority Data

Jan. 22, 2007 (KR) .......................... 10-2007-0006753

(51) Int. Cl.
*H04M 1/00* (2006.01)
(52) U.S. Cl.
USPC ................... 455/575.1; 455/575.3; 455/575.4; 455/575.2; 455/566; 455/550.1
(58) Field of Classification Search
USPC .............. 455/575.1, 575.3, 575.4, 566, 550.1
See application file for complete search history.

(56) References Cited

U.S. PATENT DOCUMENTS

| 2004/0055011 | A1* | 3/2004 | Bae et al. .......................... 725/62 |
| 2005/0104847 | A1* | 5/2005 | Tanaka et al. ................... 345/156 |
| 2006/0146030 | A1* | 7/2006 | Kim ................................. 345/169 |
| 2006/0172764 | A1* | 8/2006 | Makino ........................ 455/550.1 |
| 2006/0211460 | A1* | 9/2006 | Jeong et al. .................. 455/575.4 |
| 2006/0223596 | A1* | 10/2006 | Hur .............................. 455/575.4 |

FOREIGN PATENT DOCUMENTS

| KR | 1020070068499 | 7/2007 |
| KR | 1020080028257 | 3/2008 |

* cited by examiner

*Primary Examiner* — Manpreet Matharu
(74) *Attorney, Agent, or Firm* — The Farrell Law Firm, P.C.

(57) ABSTRACT

A rotation hinge apparatus of a portable terminal including a body housing, a folder including a liquid crystal display section and rotated in the body housing about first and second axes, and a connection member rotatably connecting the folder about the first and second hinge axes includes a base member; a rotation member; first and second guide pins provided in the rotation member; first and second guide sections provided in the base member. The first and second guide sections engage the first and second guide pins to place the liquid crystal display section of the folder at the center of the connection member by guiding linear movement of the first guide pin when the rotation member is rotated about the second hinge axis, and by moving the second guide pin, guiding and moving the second hinge axis in an inclined manner and then in a curved manner.

20 Claims, 28 Drawing Sheets

ROTATION HINGE APPARATUS FOR A PORTABLE TERMINAL, DUAL HINGE APPARATUS HAVING THE SAME, SWING-TYPE PORTABLE TERMINAL, AND SLIDING/ROTATION-TYPE PORTABLE TERMINAL

PRIORITY

This application claims priority under 35 U.S.C. §119(a) of an application entitled "Rotation Hinge Apparatus For A Portable Terminal, Dual Hinge Apparatus Having The Same, Swing-Type Portable Terminal, And Sliding/Rotation-Type Portable Terminal" filed in the Korean Industrial Property Office on Jan. 22, 2007 and assigned Serial No. 2007-0006753, the contents of which are hereby incorporated by reference.

BACKGROUND OF THE INVENTION

1. Field of the Invention

The present invention relates to a rotation hinge apparatus of a portable terminal, which can guide and move the hinge apparatus linearly or in an inclined manner and then in a curved manner when a folder is rotated in the clockwise and counter-clockwise directions.

2. Description of the Related Art

Generally, "a portable terminal" refers to a device capable of performing wireless communication with a partner while being carried by a user. Portable terminals are classified into various types according to their appearance. For example, portable terminals are classified into a bar-type, a flip-type, or a folder-type according to their appearance. The bar-type terminal refers to a portable terminal in which a single housing is in the shape of a bar, a flip-type terminal refers to a portable terminal in which a bar-type housing and a flip can rotate by a hinge apparatus, and a folder-type terminal refers to one in which a folder connects to a single bar-type housing by a hinge apparatus so as to be folded.

Further, the portable terminal is classified into rotation-type or slide-type wireless terminal according to its opening/closing method. The rotation-type terminal refers to a terminal in which two housings rotatably connect to each other, with the housings facing each other, and the slide-type terminal refers to one in which two housings open and close when they move lengthwise, with the housings facing each other. The variously classified portable terminals can be understood by those skilled in the art.

The variously classified conventional portable terminals mainly are portable terminals which are thin, light, and small, and which can be conveniently carried. However, the conventional portable terminals have disadvantages in that they are convenient only for voice communication or for video communication.

Although mobile communication services have become gradually varied and portable terminals have evolved into multimedia devices, portable terminals still take the form of conventional folder-type and slide-type terminals. Further, although the uses of portable terminals become common and the tastes of users become varied, the types of the portable terminals do not satisfy the various tastes of users.

In order to solve the disadvantages, a display-rotation-type portable terminal has been developed.

The display-rotation-type portable terminal allows a user to watch a motion picture or a video in a wide screen by rotating a display unit of a folder.

As shown in FIG. 1, the display-rotation-type portable terminal includes a body housing 10 including a first hinge axis A1 at its one end, a folder 20, and a connection member 30. Various key buttons 11 and a microphone 12 are mounted to the body housing 10. The connection member 30 connects the body housing 10 and the folder 20 and allows the folder 20 to be rotated about the first hinge axis A1 so as to be close to or far away from the body housing 10. Further, the connection member 30 is provided with a second hinge axis to rotatably connect the folder 20, with the folder 20 facing the connection member 30. The folder 20 is provided with a Liquid Crystal Display section (LCD) 21 as a display device and a speaker 22.

However, the conventional display-rotation-type portable terminal requires a rotation space D1 between the body housing and the folder so that the folder can be opened about the first hinge axis and an end of a corner of a rectangular display device of the folder can be rotated when the display device is rotated. Further, since the rotational shaft of the display device of the folder is located at the center of the folder, the rotation space is unnecessarily required when the folder is rotated. Further, if the display device becomes larger, the rotation space D1 also becomes larger, thereby increasing the size of the terminal and obstructing the miniaturization of the terminal.

Further, if the size of the display device becomes larger, the rotational shaft is located at an upper end of the body. In this state, if the folder is positioned on the bottom surface, the folder falls down.

SUMMARY OF THE INVENTION

Accordingly, the present invention has been made to solve the above-mentioned problems occurring in the prior art, and the present invention provides a rotation hinge apparatus of a portable terminal capable of reducing the size of the terminal by reducing an unnecessary rotation space generated in a conventional terminal by guiding and moving the hinge apparatus linearly or in an inclined manner and then in a curved manner when a folder is rotated in the clockwise and counter-clockwise directions to locate the folder close to a body housing and of improving the use of the terminal by rotating the folder to the right and left directions.

The present invention also provides a dual hinge apparatus of a portable terminal which rotates a large-sized display and a key pad in the clockwise and counter-clockwise directions, the dual hinge apparatus being capable of improving the use of the terminal by selectively rotating the large-sized liquid crystal display section and the key pad according to the use of the terminal.

The present invention also provides a rotation hinge apparatus of a swing-type portable terminal which is guided and moved linearly or in an inclined manner and then in a curved manner, the rotation hinge apparatus being capable of being applied to various portable terminals.

The present invention also provides a rotation hinge apparatus of a sliding/rotation-type portable terminal which is guided and moved linearly or in an inclined manner and then in a curved manner, the rotation hinge apparatus being capable of being applied to various portable terminals.

The present invention also provides a dual hinge apparatus of a portable terminal capable of improving the use of keys of the terminal by providing at least one operation mode key opened and closed when the folder is rotated in the clockwise and counter-clockwise directions on the inner surface of a connection member.

In accordance with an aspect of the present invention, there is provided a rotation hinge apparatus of a portable terminal including a body housing; a folder including a liquid crystal display section and rotated in the body housing about first and second axes; and a connection member rotatably connecting the folder about the first and second hinge axes. The rotation hinge apparatus includes a base member, a rotation member, first and second guide pins provided in the rotation member, and first and second guide sections provided in the base member. The first and second guide sections engage the first and second guide pins to place the liquid crystal display section of the folder at the center of the connection member by guiding linear movement of the first guide pin when the rotation member is rotated about the second hinge axis in the clockwise or counter-clockwise direction, and by moving the second guide pin in an inclined manner and then in a curved manner, and guiding and moving the second hinge axis in an inclined manner and then in a curved manner. At least one force supplying means is provided between the first and second guide sections and providing a force for moving the first and second guide pins linearly or in an inclined manner and then in a curved manner.

In accordance with another aspect of the present invention, there is provided a dual hinge apparatus of a portable terminal including a body housing; a folder, including a liquid crystal display section and rotated in the body housing about first, second, and third axes; and a dual connection member providing the first, second, and third hinge axes and rotatably connecting the folder about the first, second, and third hinge axes. The dual hinge apparatus includes base members; rotation members; first and second guide pins provided in the rotation members; first and second guide sections provided in the base members. The first and second guide sections engage the first and second guide pins to place the body housing and the folder at the centers of the dual connection members by guiding linear movements of the first guide pins, when the rotation members are rotated about the second and third hinge axes in the clockwise and counter-clockwise directions, and by guiding and moving the second guide pins, in an inclined manner, and then in a curved manner, guiding and moving the second and third hinge axes in an inclined manner and then in a curved manner. At least one force supplying means is provided between the first and second guide sections, providing a force for moving the first and second guide pins linearly or in an inclined manner and then in a curved manner.

In accordance with another aspect of the present invention, there is provided a rotation hinge apparatus; a swing-type portable terminal, including a body housing; and a swing housing, including a liquid crystal display section and rotated on the upper surface, facing the body housing. The rotation hinge apparatus includes a base member, a rotation member, and first and second guide pins provided in the rotation member.

First and second guide sections are provided in the base member. The first and second guide sections engage the first and second guide pins to place the liquid crystal display section of the swing housing at the center of the body housing, by guiding linear movement of the first guide pin when the rotation member is rotated about the second hinge axis, in the clockwise or counter-clockwise direction, and by moving the second guide pin, in an inclined and then curved manner, and guiding and moving the second hinge axis, in an inclined and then curved manner. At least one force supplying means is provided between the first and second guide sections, providing a force for moving the first and second guide pins linearly or in an inclined and then curved manner.

In accordance with another aspect of the present invention, there is provided a rotation hinge apparatus of a sliding/rotation-type portable terminal including a body housing, a slide housing opened and closed by sliding the sliding housing from the body housing, and a folder including a liquid crystal display section and rotated about a hinge axis in the slide housing. The sliding/rotation hinge apparatus includes a base member, a rotation member, first and second guide pins provided in the rotation member, and first and second guide sections provided in the base member. The first and second guide sections engage the first and second guide pins to place the liquid crystal display section of the folder at the center of the body housing by guiding linear movement of the first guide pin, when the rotation member is rotated about the second hinge axis in the clockwise or counter-clockwise direction, and by moving the second guide pin in an inclined manner and then in a curved manner and guiding and moving the second hinge axis in an inclined manner and then in a curved manner. At least one force supplying means is provided between the first and second guide sections, providing a force for moving the first and second guide pins linearly or in an inclined manner and then in a curved manner.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, the first embodiment of the present invention will be described with reference to the accompanying drawings.

Figure 1:
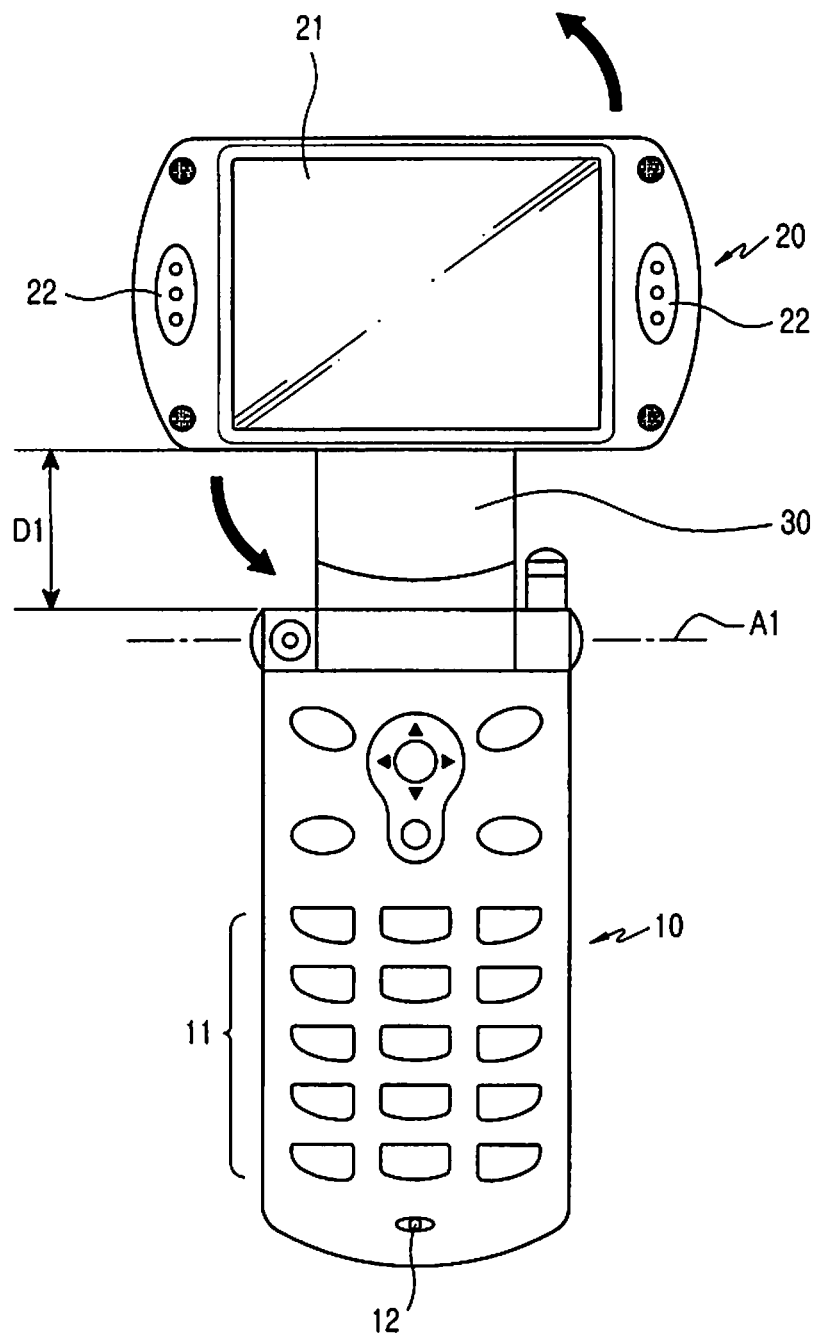
FIG. 1 is a front view of a used state of a conventional display-rotation-type portable terminal.
Figure 2:
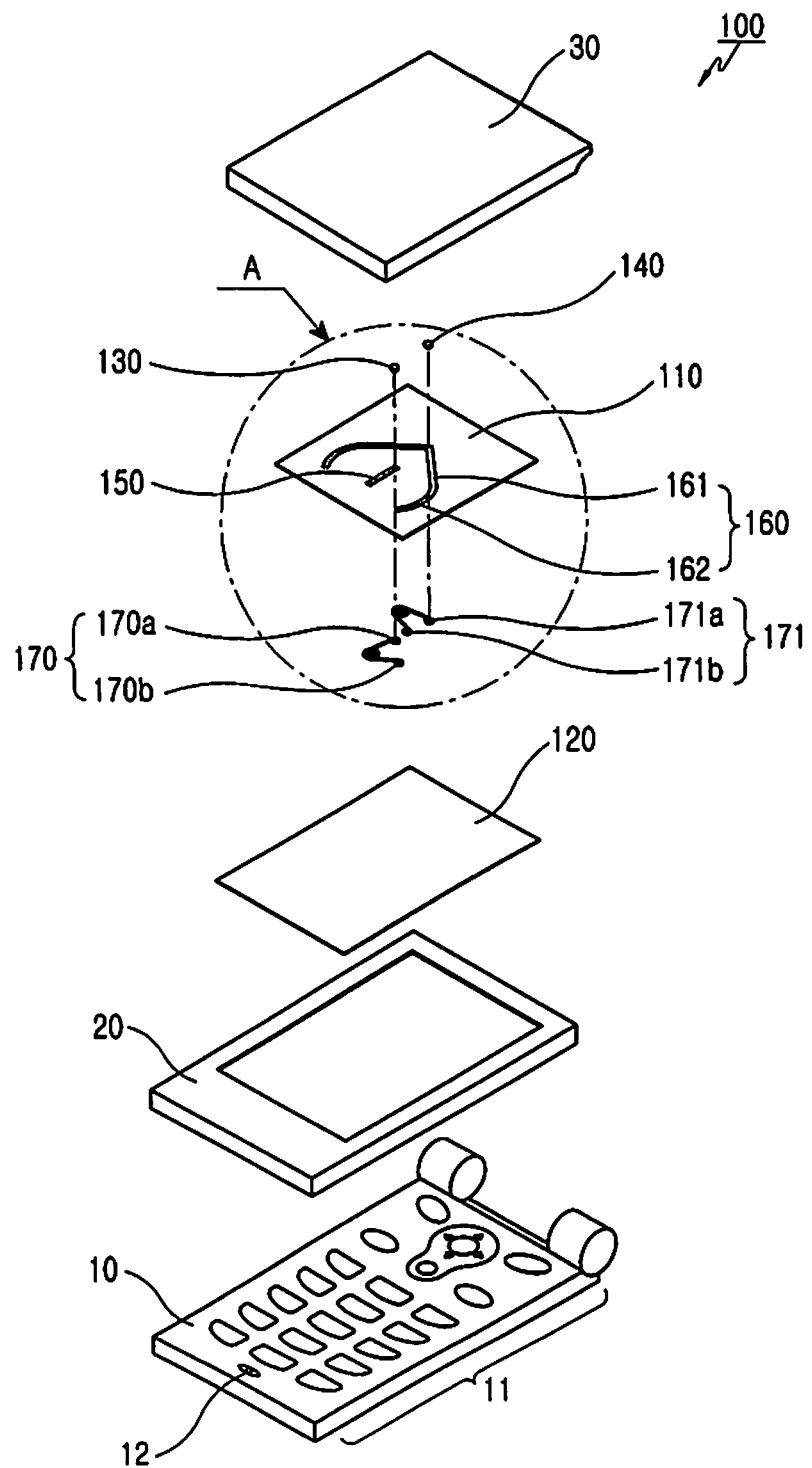
FIG. 2 is an exploded perspective view of a rotation hinge apparatus of a portable terminal according to the first embodiment of the present invention.

As shown in FIG. 2, a portable terminal includes a body housing 10, a folder 20, and a connection member 30.

As shown in FIGS. 2, 3, 5, and 6, a rotation hinge apparatus 100 of the portable terminal includes a base member 110, a rotation member 120, first and second guide pins 130 and 140, first and second guide sections 150 and 160, and at least one force supplying means. The base member 110 is engaged with the connection member 30 so as to support the rotation of the rotation member 120 is engaged with the folder 20 so as to be rotatably coupled to the base member 110.

As shown in FIGS. 7, 8, 9, 10, 11, 12, 13, and 14, the first and second guide pins 130 and 140 penetrate the first and second guide sections 150 and 160 which will be described later and are provided in the rotation member 120. The first guide section 150 is provided in the base member 110 so as to be engaged with the first guide pin 130 and so as to guide the linear movement of the first guide pin 130 when the rotation member 120 is rotated in the clockwise direction C1 or in the counter-clockwise direction C2 about a second hinge axis A2. The second guide section 160 is provided in the base member 110 so as to be engaged with the second guide pin 140 and so as to guide the second guide pin 140 in an inclined manner, to guide the second guide pin 140 in a curved manner, and to guide the second hinge axis A2 in an inclined manner and then in a curved manner, when the rotation member 120 is rotated in the clockwise direction C1 or in the counter-clockwise direction C2 about the second hinge axis A2. Then, a liquid crystal display section 21 of the folder 20 is located at the center of the connection member 30. The force supplying means, which include a first resilient member 170 and a second resilient member 171, are provided between the first and second guide sections 150 and 160 and provide a force so that the first and second guide pins 130 and 140 are moved linearly or are moved in an inclined manner and then in a curved manner.

Figure 3:
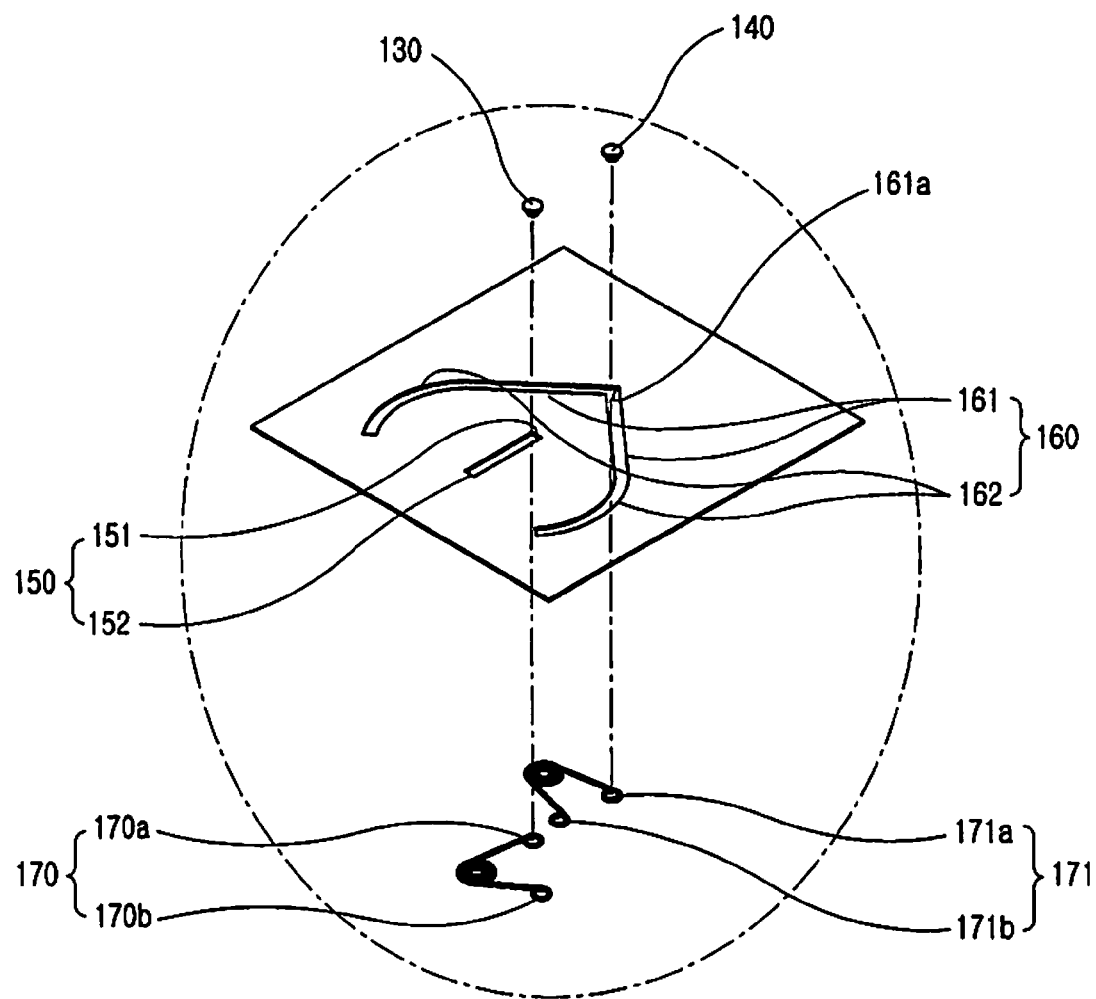
FIG. 3 is an enlarged exploded perspective view of a section A of FIG. 2.
Figure 4:
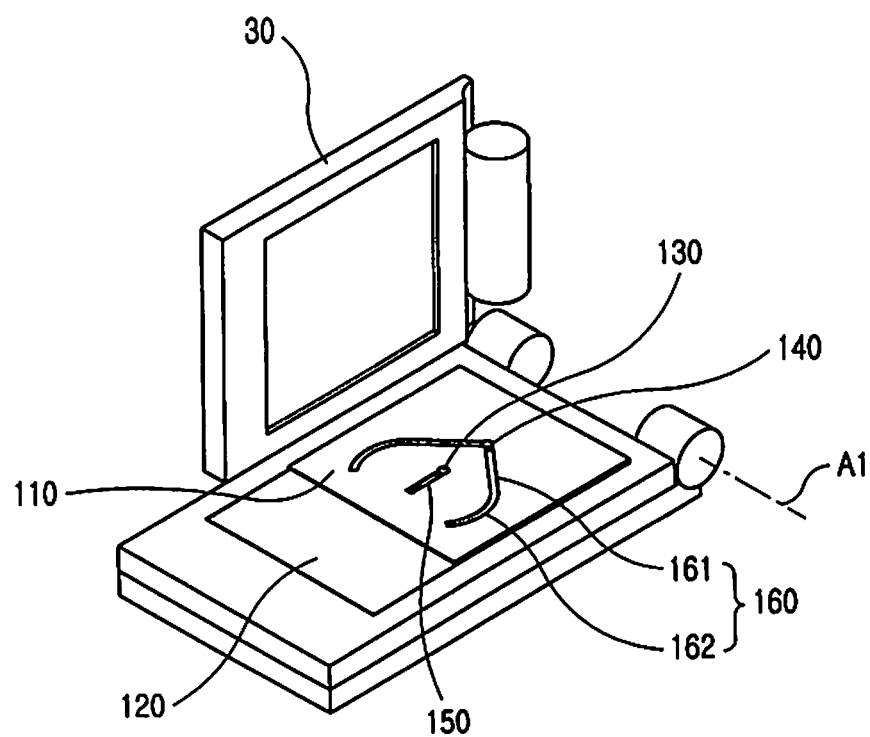
FIG. 4 is a perspective view of the rotation hinge apparatus of the portable terminal according to the first embodiment of the present invention before engagement.

As shown in FIGS. 2, 3, and 4, the first guide section 150 includes a first guide hole so that the first guide pin 130 can penetrate it, and the first guide hole 150 is linearly formed along the lengthwise direction of the folder 20.

As shown in FIG. 3, a first stopper section 151 is formed at one end of the first guide hole 150 so as to make contact with the first guide pin 130 to stop the linear movement of the first guide pin 130 at a rotation stopping position of the folder 20. A second stopper section 152 is formed at the other end of the first guide hole 150 to stop the linear movement of the first guide pin 130, with the folder 20 being rotated by 90 degrees.

Figure 12:
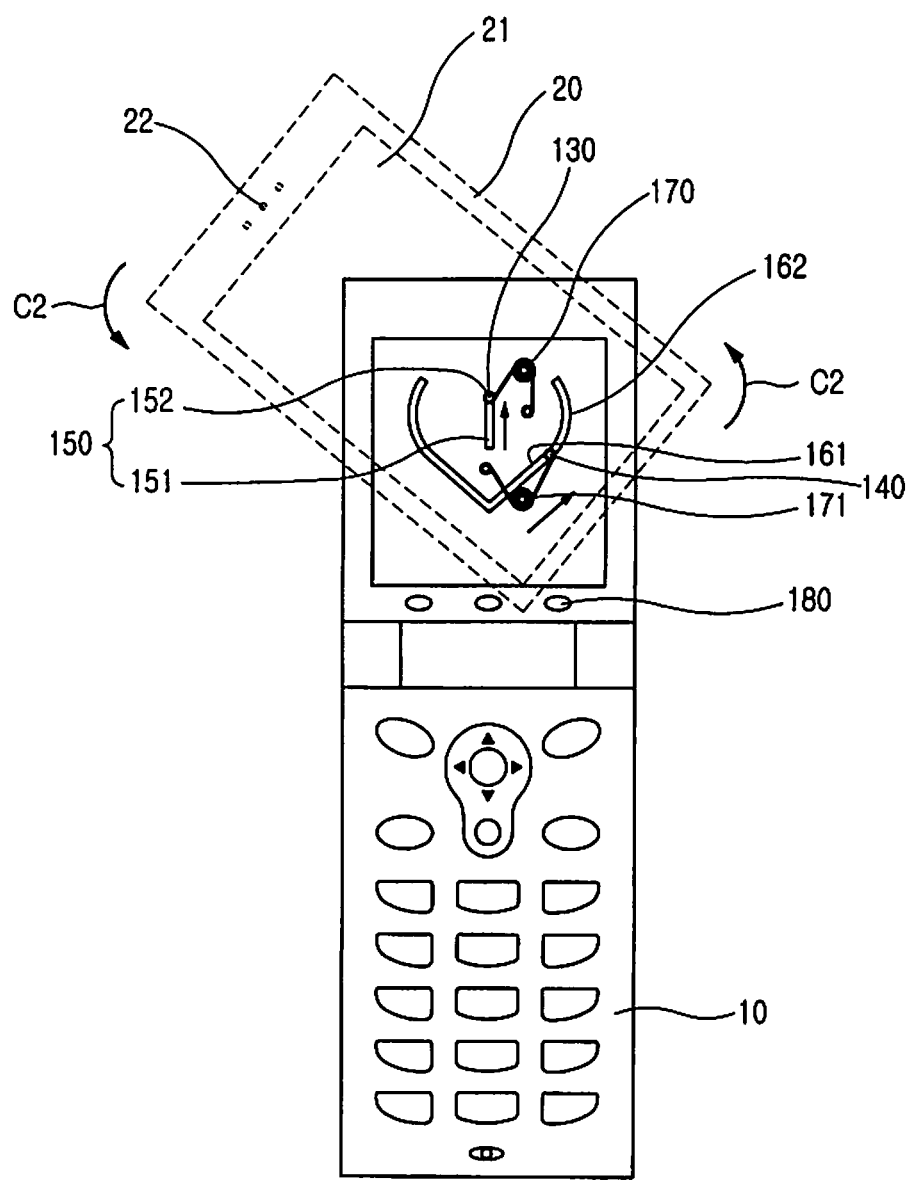
FIG. 12 is a front view of the process for rotating the folder in the counter-clockwise direction in the rotation hinge apparatus of the portable terminal according to the first embodiment of the present invention.

As shown in FIGS. 3 and 4, the second guide section 160 includes a second guide hole 160 so that the second guide pin 140 can penetrate it. An inclined guide section 161 and a curved guide section 162 form the second guide hole 160 so that the second guide pin 140 can be guided in an inclined manner if the folder 20 is rotated in the clockwise direction C1 (FIGS. 8 and 10) or in the counter-clockwise direction C2 (FIG. 12).

In this state, as shown in FIGS. 7, 8, 9, and 10, the curved guide section 162 is formed so that when the folder 20 is rotated further by 90 degrees, the second guide pin 140 can be moved along the inclined guide section 161 and is guided along a curve in the movement direction.

Figure 6:
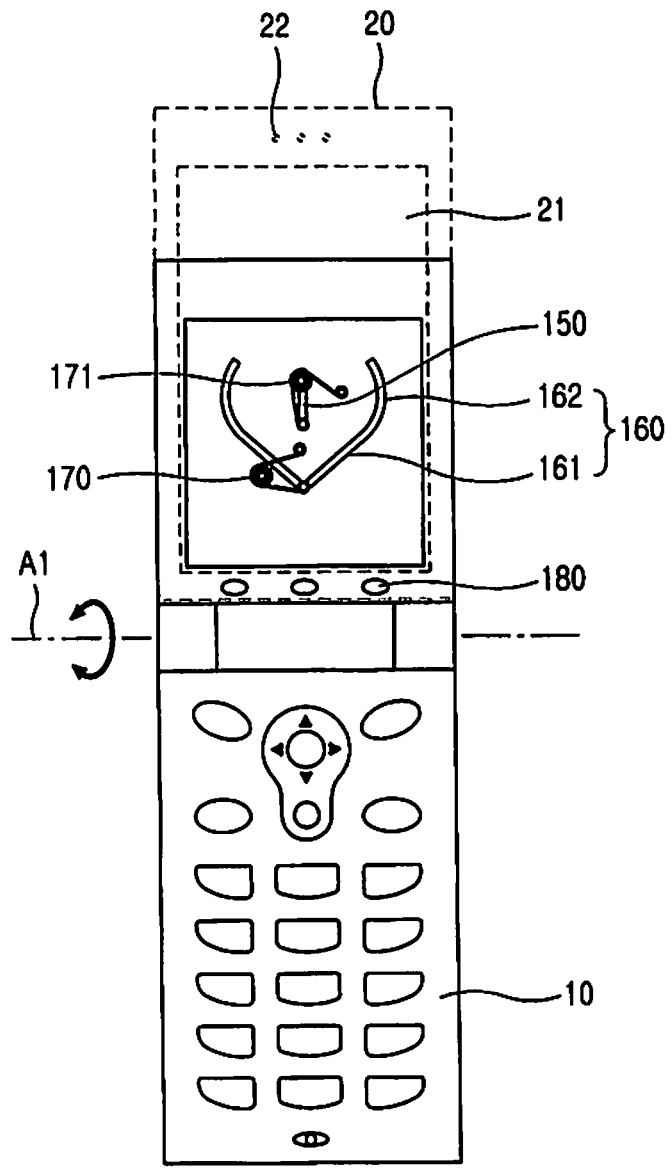
FIG. 6 is a front view of the rotation hinge apparatus of the portable terminal according to the first embodiment of the present invention, with a folder being opened.

As shown in FIG. 6, the second guide hole 160 is substantially V-shaped.

As shown in FIGS. 7, 8, 9, and 10, a first stopper section 161a is formed at one end of the inclined guide section 161 so as to make contact with the second guide pin 140 to stop the second guide pin 140 at a rotation stopping position of the folder 20. A second stopper section 162a is formed at one end of the curved guide section 162 so as to make contact with the second guide pin 140 to stop the second guide pin 140, with the folder 20 being rotated by 90 degrees.

As shown in FIGS. 2, 3, 7, and 8, the force supplying means include first and second resilient members 170 and 171. One end 170a of the first resilient member 170 is engaged with the first guide pin 130 and the other end 170b of the first resilient member 170 is engaged with the base member 110 so that it can be moved together with the first guide pin 130 along a predetermined locus as the first guide pin 130 is rotated. One end 171a of the second resilient member 171 is engaged with the second guide pin 140 and the other end 171b is engaged with the base member 110 so that it can be moved together with the second guide pin 140 along a predetermined locus as the second guide pin 140 is rotated.

Figure 8:
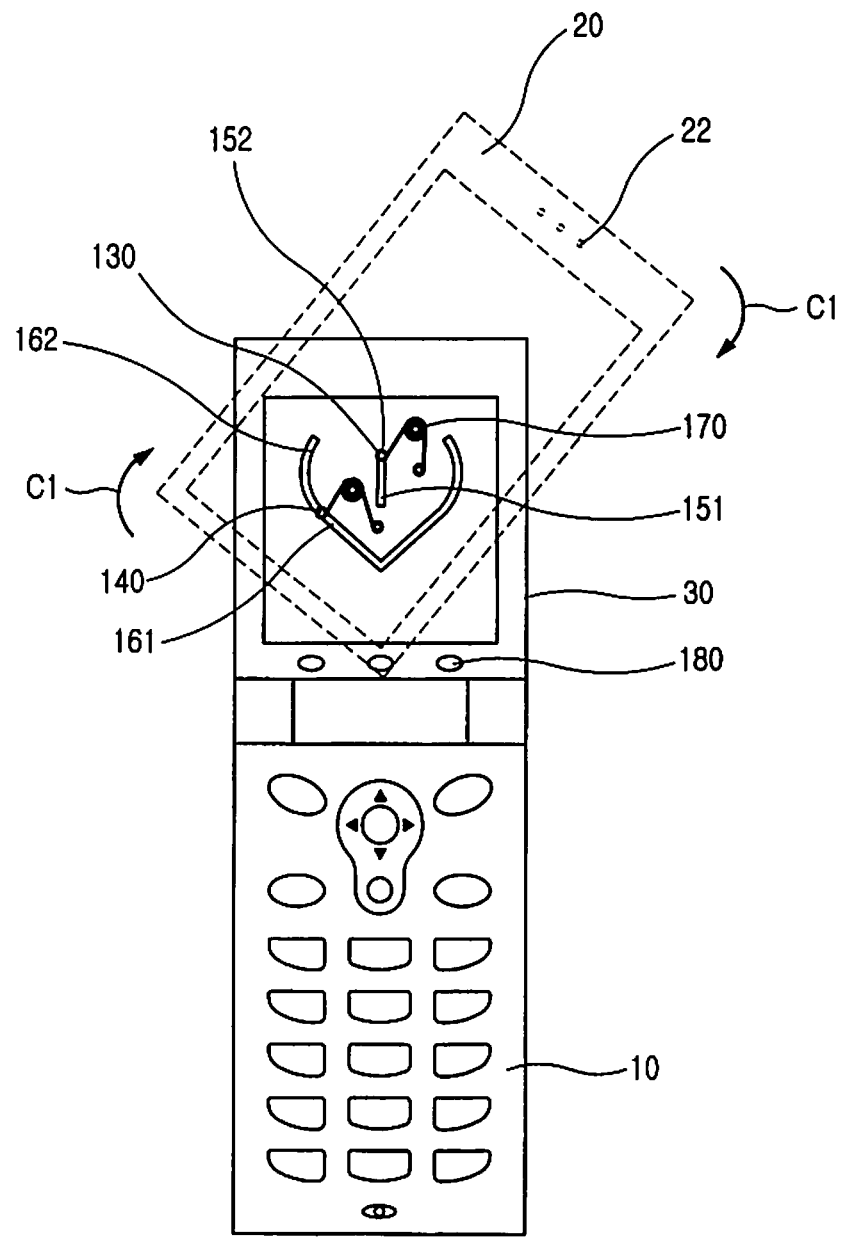
FIG. 8 is a front view of the process for rotating the folder in the clockwise direction in the rotation hinge apparatus of the portable terminal according to the first embodiment of the present invention.
Figure 10:
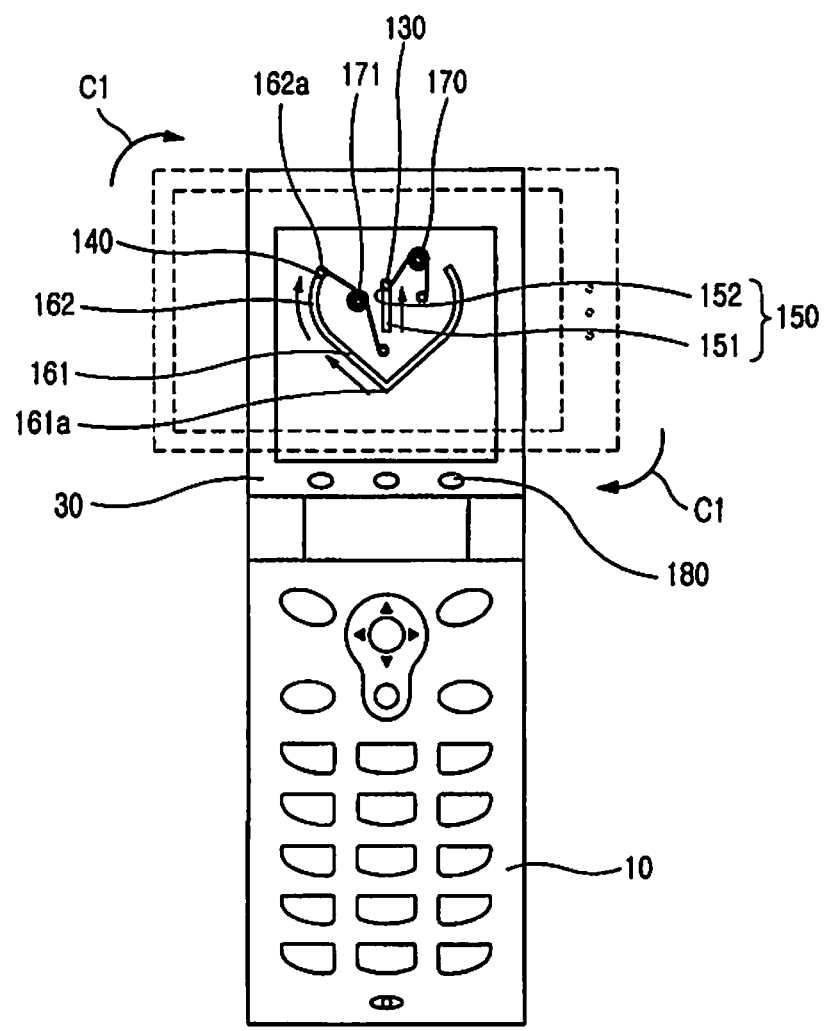
FIG. 10 is a front view of the rotation hinge apparatus of the portable terminal according to the first embodiment of the present invention, with the folder being rotated by 90 degrees in the clockwise direction.

As shown in FIGS. 8 and 10, at least one operation mode key 180 is provided on the inner surface of the connection member 30 so that the folder 20 can be opened and closed as the folder 20 is rotated about the second hinge axis A2. The operation mode key 180 is a digital multimedia broadcasting (DMB) dedicated key.

Hereinafter, the operation of the rotation hinge apparatus of the portable terminal according to the first embodiment of the present invention will be described in detail with reference to FIGS. 2 to 14.

As shown in FIG. 2, the portable terminal includes the body housing 10, the folder 20 and the connection member 30.

As shown in FIGS. 2, 3, and 4, the rotation hinge apparatus 100 of the portable terminal includes the base member 110, the rotation member 120, the first and second guide pins 130 and 140, the first and second guide sections 150 and 160, and the force supplying means. The first and second guide pins 130 and 140 penetrate the first and second guide sections 150 and 160 provided in the base member 110 and are engaged with the rotation member 120. The first and second guide sections 150 and 160 include the first and second guide holes 150 and 160. Then, the force supplying means are provided in the first and second guide sections 150 and 160. The force supplying means include the first and second resilient members 170 and 171. One end 170a of the first resilient member 170 is engaged with the first guide pin 130 and the other end 170b thereof is engaged with the base member 110. One end 171a of the second resilient member 171 is engaged with the second guide pin 140 and the other end 171b thereof is engaged with the base member 110.

In this state, as shown in FIG. 2, the base member 110 is engaged with the connection member 30 and the rotation member 120 is engaged with the folder 20.

Figure 5:
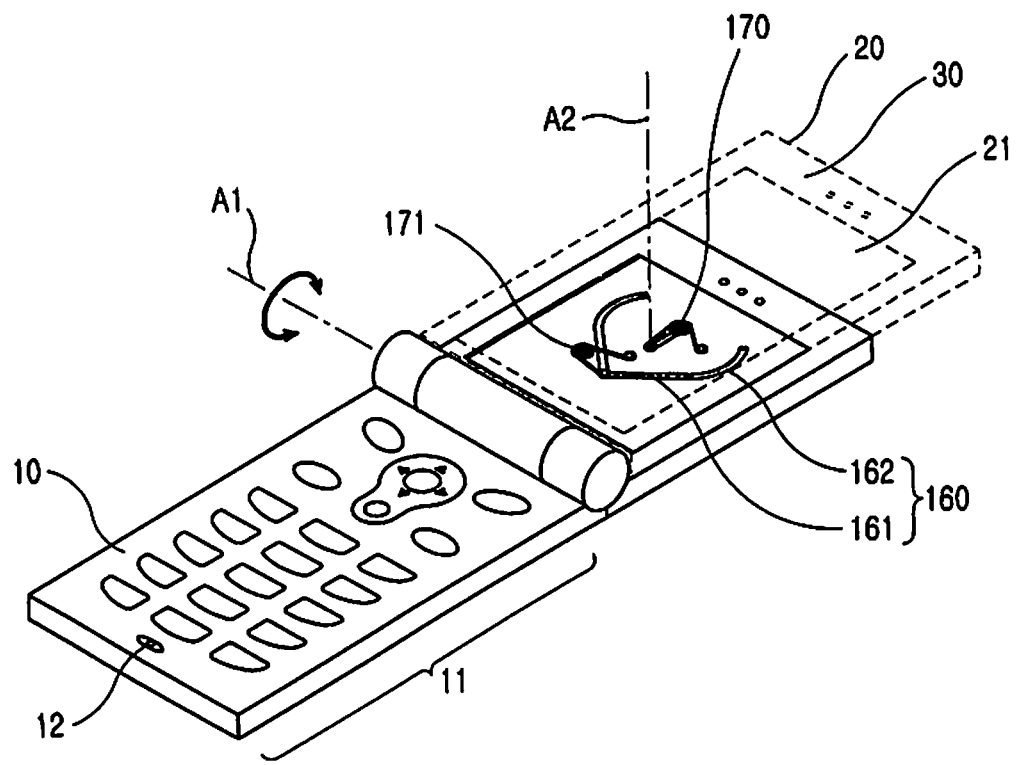
FIG. 5 is a perspective view of the rotation hinge apparatus of the portable terminal according to the first embodiment of the present invention, with a folder being opened.

In this state, as shown in FIGS. 5 and 6, the folder 20 is rotated about the first hinge axis A1 of the connection member 30 so as to be far away from the body housing 10.

As shown in FIGS. 7, 8, 9, and 10, the folder 20 is rotated about the second hinge axis A2 along the clockwise direction C1 from the longitudinal direction to the transverse direction.

Figure 7:
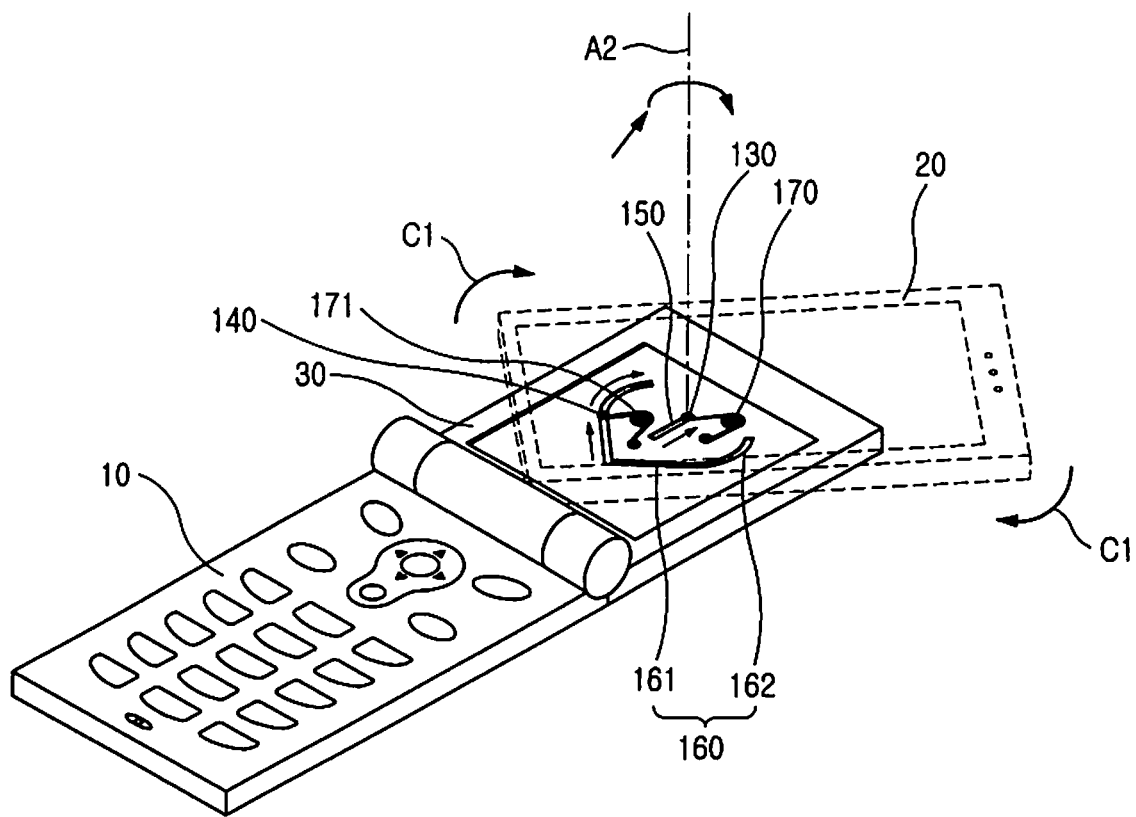
FIG. 7 is a perspective view of a process for rotating the folder in the clockwise direction in the rotation hinge apparatus of the portable terminal according to the first embodiment of the present invention.

Then, as shown in FIGS. 7 and 8, the first guide pin 130 is linearly guided and moved along the first guide hole 150 and the second guide pin 140 is guided and moved along the inclined guide section 161 of the second guide hole 160.

Figure 9:
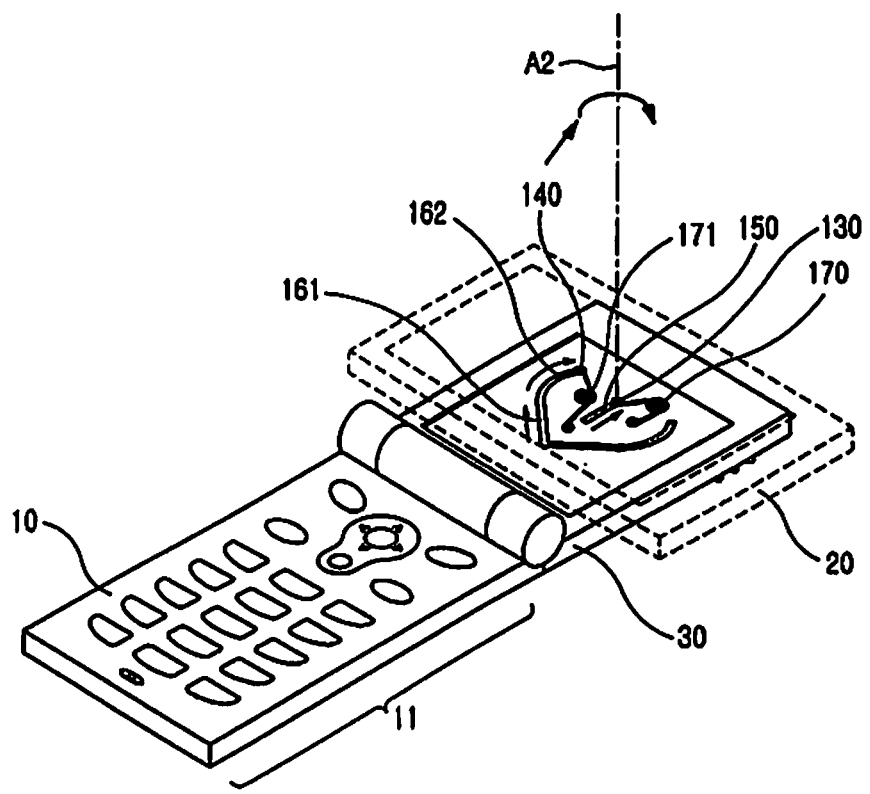
FIG. 9 is a perspective view of the rotation hinge apparatus of the portable terminal according to the first embodiment of the present invention, with the folder being rotated by 90 degrees in the clockwise direction.

Then, as shown in FIGS. 9 and 10, the second guide pin 140 is guided and moved in an inclined manner along the inclined guide section 161 and is guided and moved in a curved manner along the curved guide section 162 formed in the second guide hole 150 in the movement direction.

As shown in FIG. 10, the folder 20 is rotated by 90 degrees in the clockwise direction C1 to be located transversely. Then, the at least one operation mode key 180 provided on the inner surface of the connection member 30 is exposed to be used when a user intends to use the portable terminal. The operation mode key 180 includes a DMB dedicated key, a mail dedicated key, and a camera dedicated key.

Then, as shown in FIG. 8, the first and second resilient members 170 and 171 provide resilient forces so that the first and second guide pins 130 and 140 can be moved along the first and second guide holes 150 and 160 linearly or in an inclined manner and then is guided and moved in a curved manner. The first and second resilient members 170 and 171 are moved together with the second guide pin 140 along a predetermined locus as the second guide pin 140 is rotated in the clockwise direction C1.

As shown in FIG. 6, the second guide hole 160 is substantially V-shaped so that the second guide pin 140 is moved in an inclined manner and then is guided and moved in a curved manner.

As shown in FIGS. 7, 8, 9, and 10, a first stopper 151 is formed at one end of the first guide hole 150 so as to make contact with the first guide pin 130 to stop the linear movement at a rotation stopping position of the folder 20. Further, a second stopper 152 is formed at the other end of the first guide hole 150 so as to stop the linear movement of the first guide pin 130, with the folder 20 being rotated by 90 degrees in the clockwise direction C1. Therefore, when the folder 20 is rotated by 90 degrees in the clockwise direction C1, the first guide pin makes contact with the second stopper 152 to stop the linear movement.

As shown in FIGS. 9 and 10, since the second stopper section 162a is formed at one end of the curved guide section 162 to stop the folder 20, with the folder being rotated by 90 degrees in the clockwise direction C1, if the folder 20 is rotated by 90 degrees in the clockwise direction C1, the second guide pin 140 makes contact with the second stopper section 162a to move the second guide pin 140 in an inclined manner and then in a curved manner, and then stop the second guide pin 140.

Here, as shown in FIGS. 5 and 6, the folder is reversely rotated and is moved to the original position. The first and second guide pins 130 and 140 are separated from the second stoppers 152 and 162a and the first guide pin 130 is reversely guided and moved along the first guide hole 150 linearly. The first guide pin 130 makes contact with the first stopper section 151 of the first guide hole 150 to stop the linear movement.

At the same time, the second guide pin 140 passes the curved guide section 162 and is moved in an inclined manner along the inclined guide section 161, so that the second guide pin 140 can make contact with the first stopper section 161a formed at the end of the second guide hole 160 to stop the movement.

The first and second guide pins 130 and 140 are provided with resilient forces by the first and second resilient members 170 and 171 so that they can be moved linearly or in a curved manner and then be moved in an inclined manner.

Then, the exposed operation mode key 180 is closed.

As shown in FIGS. 11, 12, 13, and 14, the folder 20 is rotated in the counter-clockwise direction about the second hinge axis A2 from the transverse direction to the longitudinal direction, with the folder 20 being located at the original position.

Figure 11:
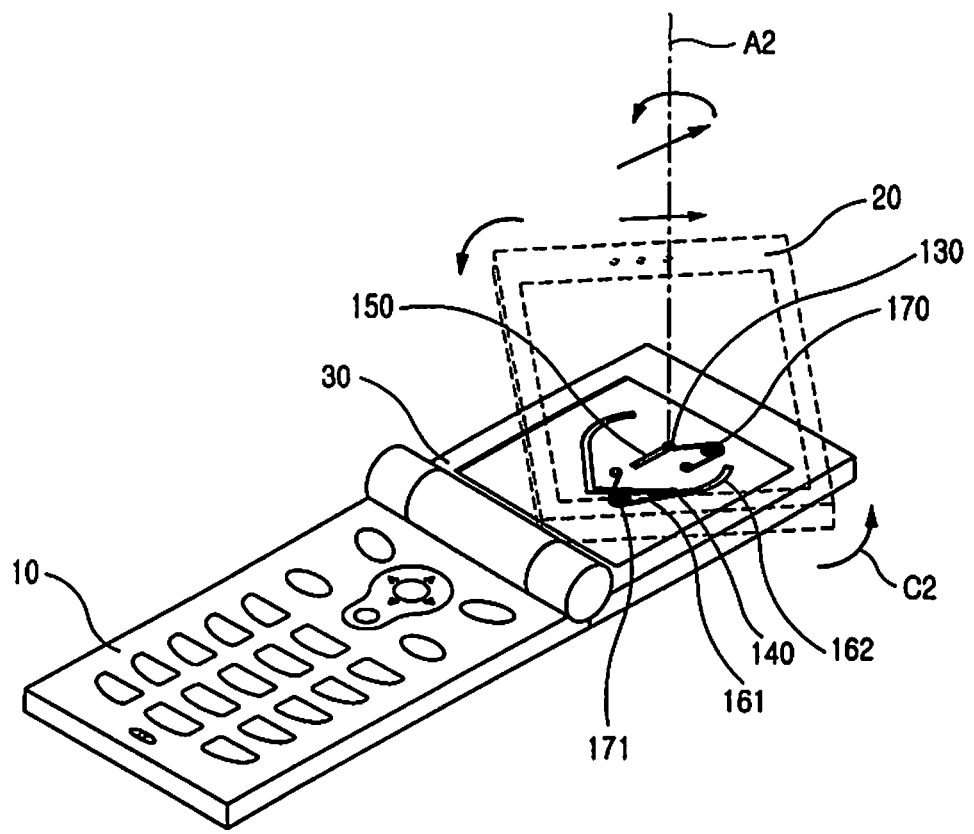
FIG. 11 is a perspective view of a process for rotating the folder in the counter-clockwise direction in the rotation hinge apparatus of the portable terminal according to the first embodiment of the present invention.

Then, as shown in FIGS. 11 and 12, the first guide pin 130 is guided and moved linearly along the first guide hole 150 and the second guide pin 140 is guided and moved in an inclined manner along the inclined guide section 161 of the second guide hole 160.

Then, as shown in FIGS. 11 and 12, the second guide pin 140 is guided and moved along the inclined guide section 161 in an inclined manner and is guided and moved along the curved guide section 162 formed in the second guide hole 160 in the movement direction.

Figure 13:
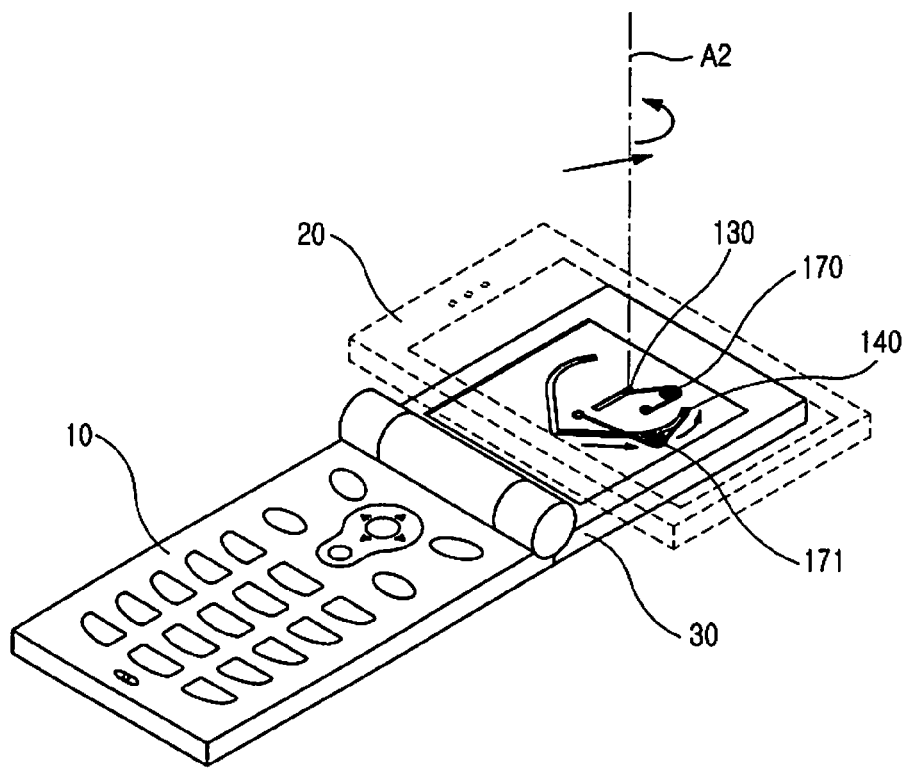
FIG. 13 is a perspective view of the rotation hinge apparatus of the portable terminal according to the first embodiment of the present invention, with the folder being rotated by 90 degrees in the counter-clockwise direction.
Figure 14:
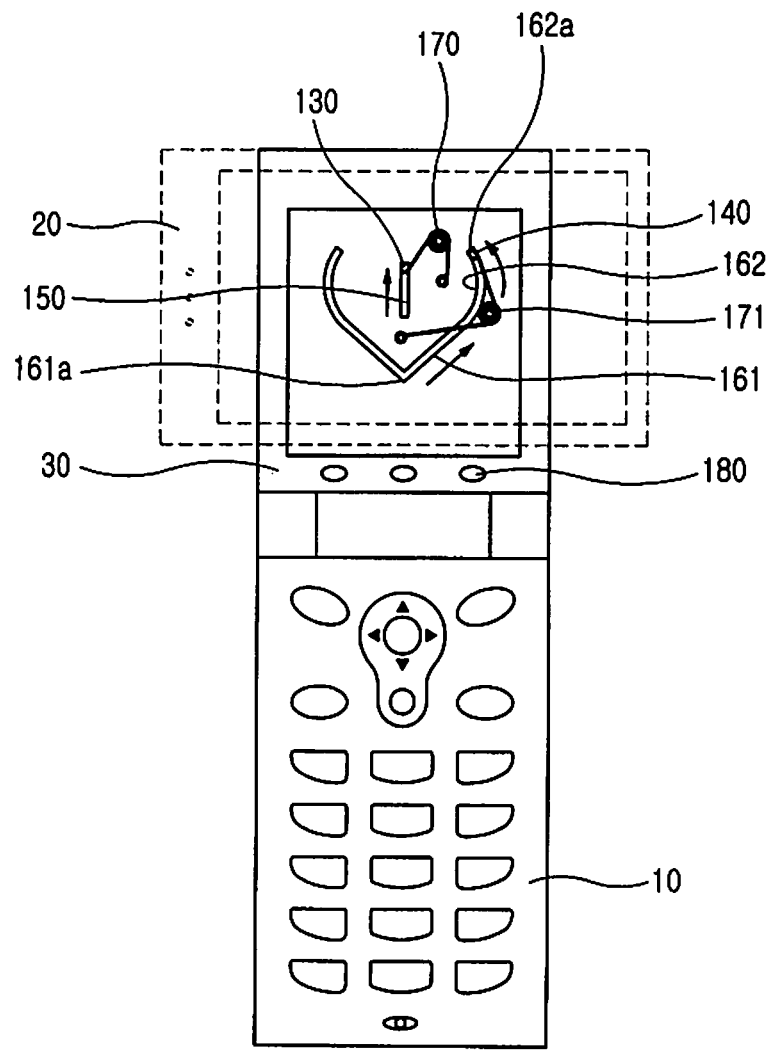
FIG. 14 is a front view of the rotation hinge apparatus of the portable terminal according to the first embodiment of the present invention, with the folder being rotated by 90 degrees in the counter-clockwise direction.

As shown in FIGS. 13 and 14, the folder is rotated by 90 degrees in the counter-clockwise direction C1 and is located transversely.

Then, as shown in FIGS. 12 and 14, the first and second resilient members 170 and 171 provide resilient forces so that the first and second guide pins 130 and 140 can be moved linearly or in a curved manner and then in a curved manner along the first and second guide holes 150 and 160. The first and second resilient members 170 and 171 are moved together with the second guide pin 140 along a predetermined locus when the second guide pin 140 is rotated in the counter-clockwise direction C1.

As shown in FIGS. 11, 12, 13, and 14, the first stopper section 151 is formed at one end of the first guide hole 150 so as to make contact with the first guide pin 130 to stop the linear movement of the first guide pin 130 at a rotation stopping position of the folder 20, and the second stopper section 152 is formed at the other end of the first guide hole 150 to stop the linear movement of the first guide pin 130, with the folder 20 being rotated by 90 degrees. Therefore, the folder is rotated by 90 degrees in the counter-clockwise direction C1, and at the same time, the first guide pin 130 makes contact with the second stopper section 152 to stop the linear movement.

At the same time, the second stopper section 162a is formed at one end of the curved guide section 162 to stop the folder 20, with the folder 20 being rotated by 90 degrees in the counter-clockwise direction. Similarly, if the folder 20 is rotated by 90 degrees in the counter-clockwise direction C2, the second guide pin 140 makes contact with the second stopper section 162a so that the second guide pin 140 can be moved in an inclined manner, and then can stop the curved movement.

As mentioned above, since the folder 20 can be rotated to the both directions, i.e. to the right and to the left, a user can conveniently use the portable terminal regardless of whether the user is right handed or left handed.

Hereinafter, the operation of a dual hinge apparatus of a portable terminal according to the second embodiment of the present invention will be described in detail with reference to FIGS. 15 to 24.

Figure 15:
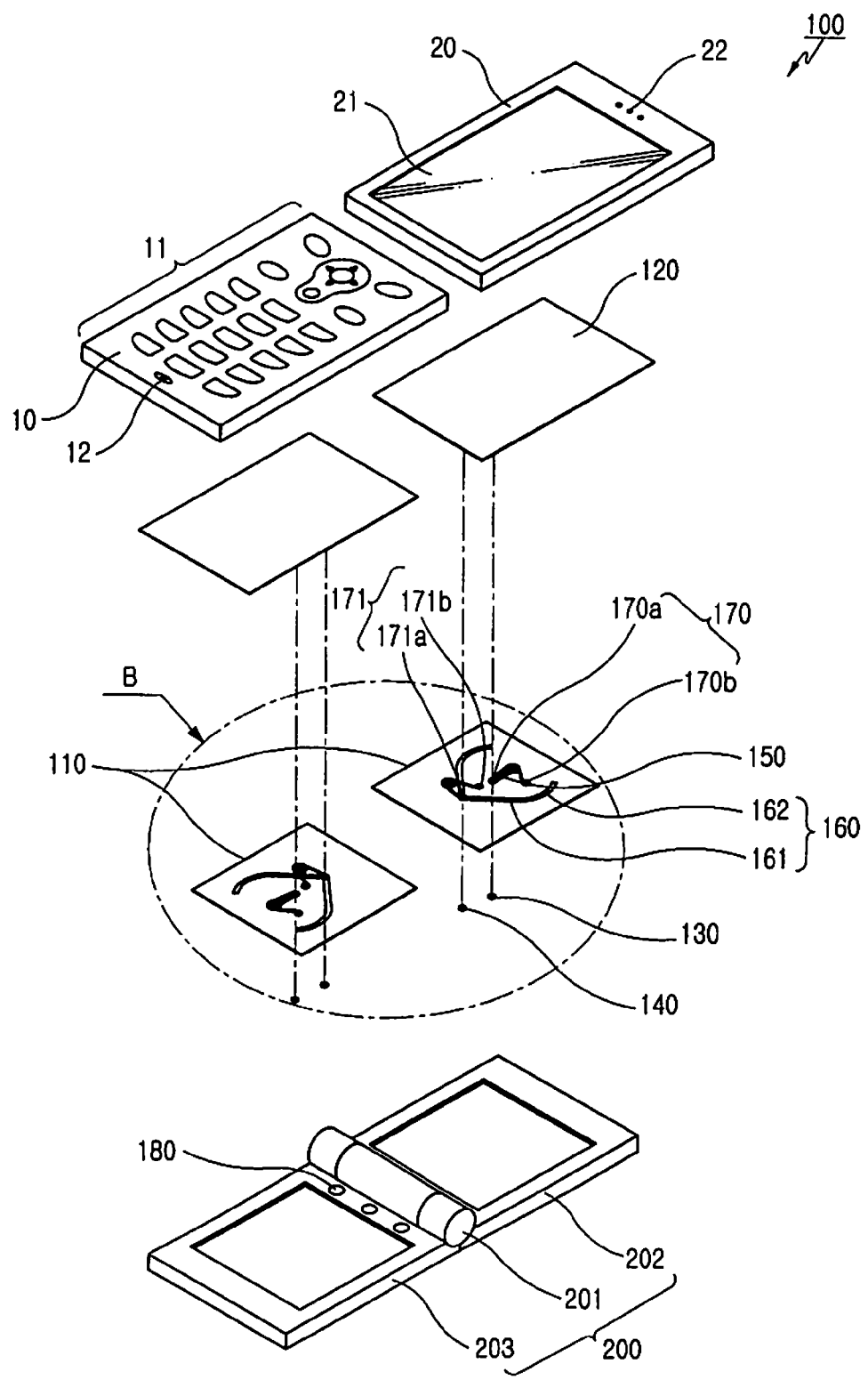
FIG. 15 is an exploded perspective view of a dual hinge apparatus of a portable terminal according to the second embodiment of the present invention.
Figure 16:
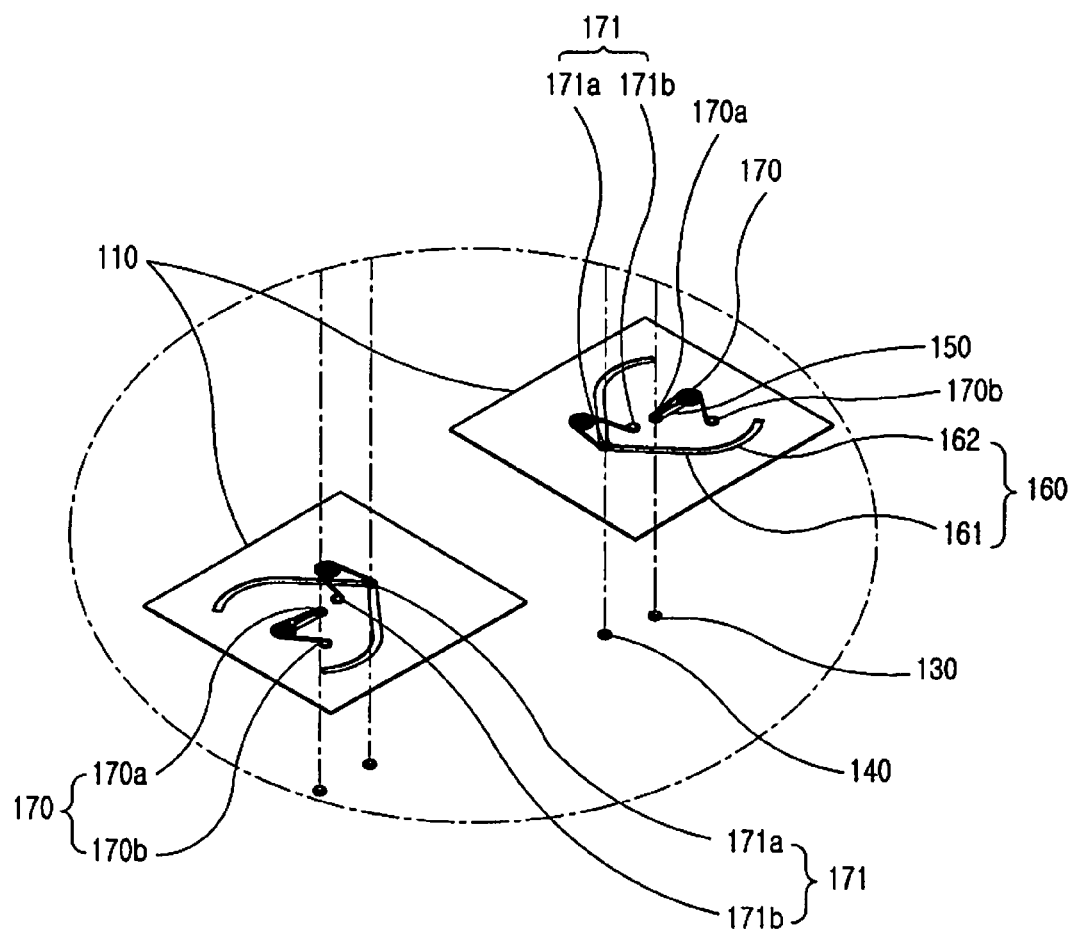
FIG. 16 is an enlarged exploded view of a section B of FIG. 15.

As shown in FIGS. 15 and 16, the portable terminal includes a body housing 10, a folder 20, and a dual connection member 200. The dual connection member 200 includes first, second, and third connection members 201, 202, and 203, respectively. The second and third connection members 202 and 203 are connected by the first connection member 201 so as to be rotated about a first hinge axis A1 in the clockwise direction C1 and in the counter-clockwise direction C2.

As shown in FIGS. 15 and 16, the dual hinge apparatus 100 of the portable terminal includes base members 110, rotation members 120, first and second guide pins 130 and 140, first and second guide sections 150 and 160, and force supplying means. The first and second guide pins 130 and 140 penetrate first and second guide sections 150 and 160 provided in the base members 110 and are engaged with the rotation members 120. The first and second guide sections 150 and 160 include first and second guide holes 150 and 160, respectively.

Then, as shown in FIG. 16, the first and second guide sections 150 and 160 are provided with the force supplying means. The force supplying means include first and second resilient members 170 and 171. One end 170a of the first resilient member 170 is engaged with the first guide pin 130 and the other end 170b thereof is engaged with the base member 110. One end 171a of the second resilient member 171 is engaged with the second guide pin 140 and the other end 171b thereof is engaged with the base member 110.

In this state, as shown in FIG. 15, the base members 110 are engaged with he second and third connection members 202 and 203 and the rotation member 120 is engaged with the body housing 10 and the folder 20.

Figure 17:
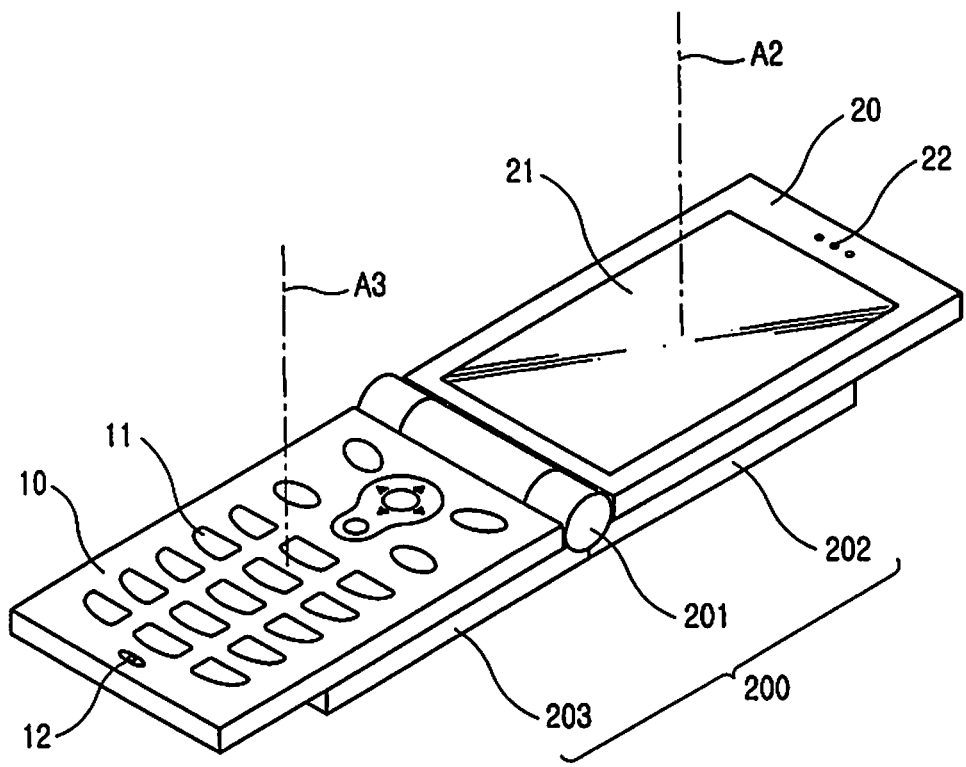
FIG. 17 is a perspective view of an engaged state of the dual hinge apparatus of the portable terminal according to the second embodiment of the present invention.
Figure 18:
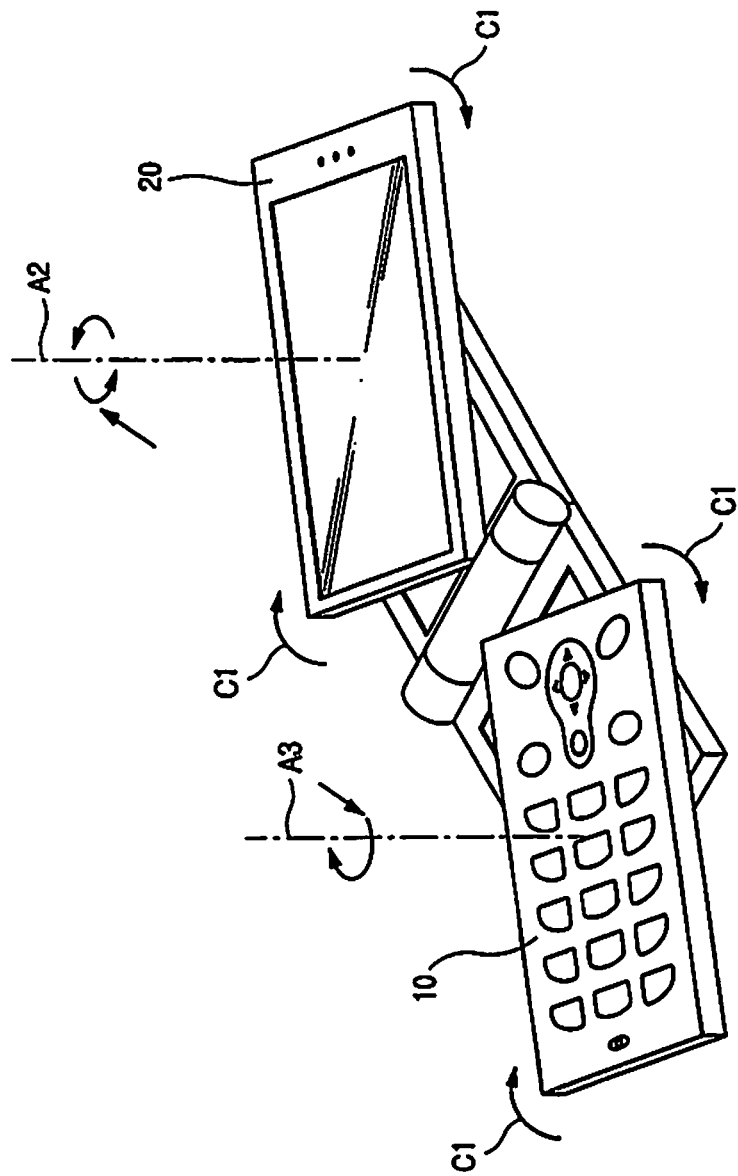
FIG. 18 is a perspective view of a process for rotating a body housing and a folder in the clockwise direction in the dual hinge apparatus of the portable terminal according to the second embodiment of the present invention.

In this state, as shown in FIG. 17, when the terminal is to be used in the talking mode, the folder 20 is rotated about the first hinge axis A1 of the first connection member 201 so as to be far away from the body housing 10.

As shown in FIGS. 18, 19, 20, and 21, when a game, TV, or an motion picture is watched using a liquid crystal display section 21 and a key pad 11, the body housing and the folder 20 are rotated about the second and third hinge axes A2 and A3 in the clockwise direction C1 from the longitudinal direction to the transverse direction.

Figure 19:
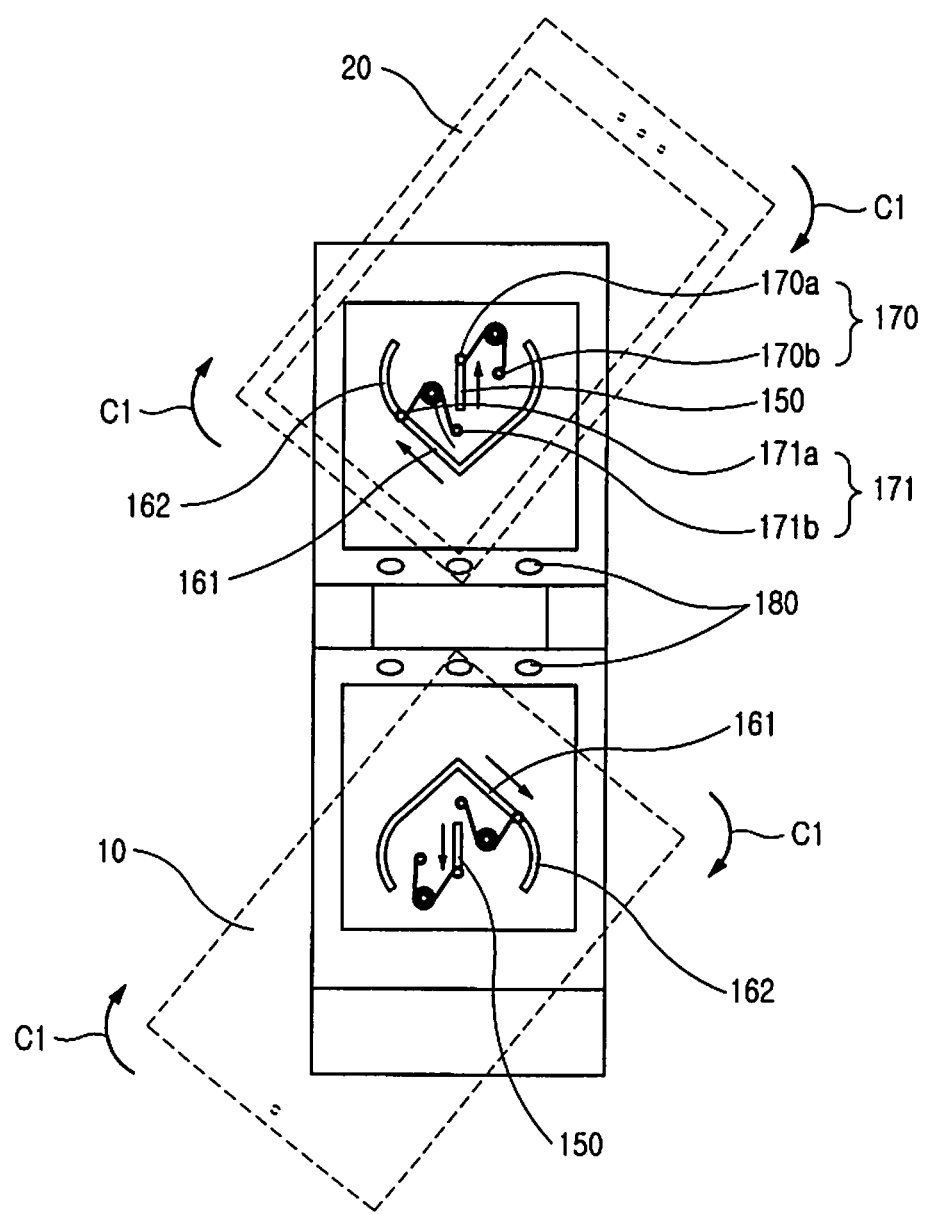
FIG. 19 is a front view of the process for rotating the body housing and the folder in the clockwise direction in the dual hinge apparatus of the portable terminal according to the second embodiment of the present invention.
Figure 21:
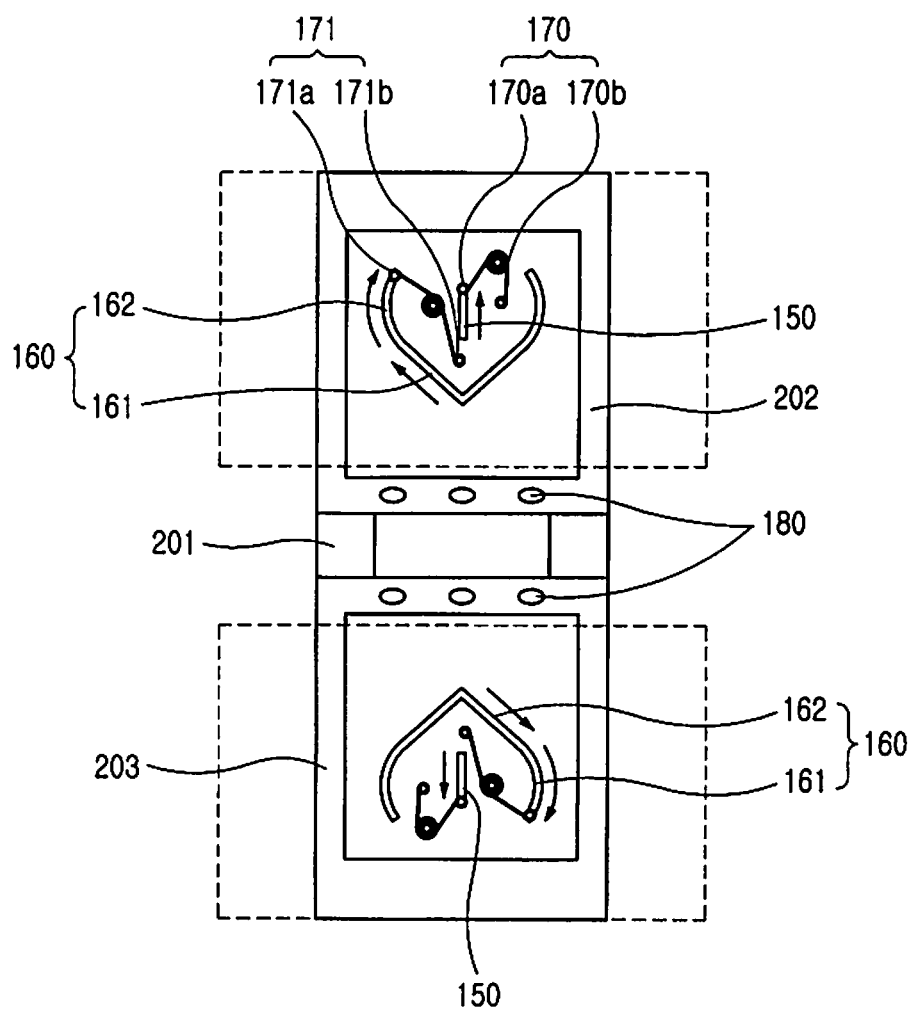
FIG. 21 is a front view of the dual hinge apparatus of the portable terminal according to the second embodiment of the present invention, with the body housing and the folder being rotated by 90 degrees in the clockwise direction.

Then, as shown in FIGS. 19 and 21, the first guide pins 130 are guided and moved linearly along the first guide holes 150 and the second guide pins 140 are moved in an inclined manner along inclined guide sections 161 of the second guide holes 160 and are guided and moved along curved guide sections 162 extending from the inclined guide sections 161.

Figure 20:
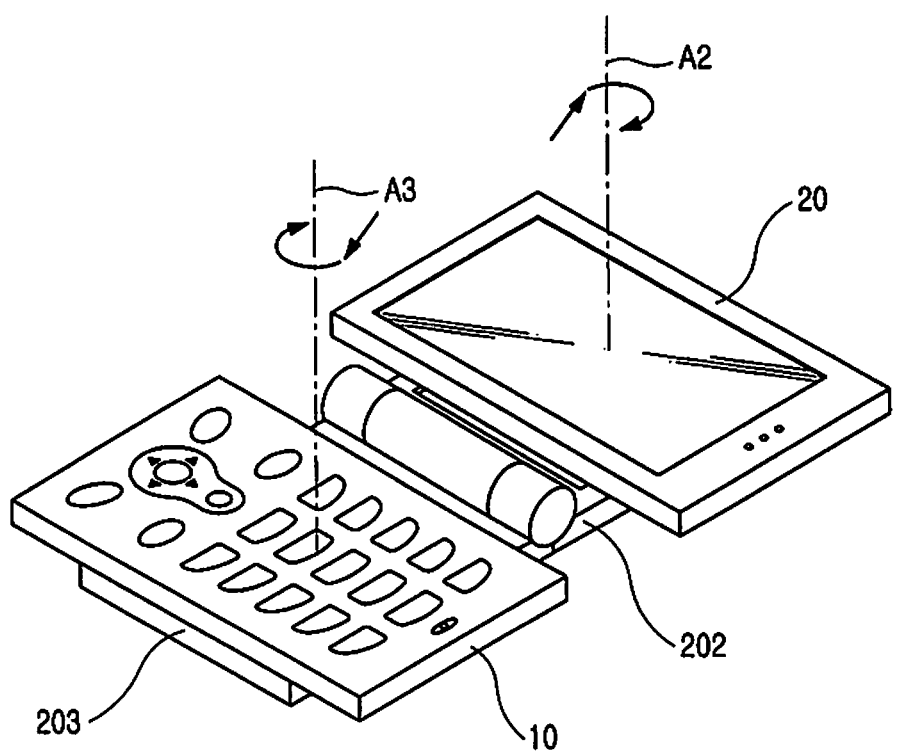
FIG. 20 is a perspective view of the dual hinge apparatus of the portable terminal according to the second embodiment of the present invention, with the body housing and the folder being rotated by 90 degrees in the clockwise direction.

Then, as shown in FIGS. 20 and 21, the body housing 10 and the folder 20 is rotated by 90 degrees in the clockwise direction C1 and is located transversely.

Then, as shown in FIG. 21, at least one operation mode key 180 provided on the inner surface of the connection member 30 is exposed to be used when a user intends to use the portable terminal. An operation mode key 180 includes a DMB dedicated key, a mail dedicated key, and a camera dedicated key.

Then, as shown in FIGS. 19 and 21, the first and second resilient members 170 and 171 provide resilient forces so that the first and second guide pins 130 and 140 are moved linearly or in an inclined manner and then are guided and moved in a curved manner along the first and second guide holes 150 and 160.

As shown in FIG. 21, if the body housing 10 and the folder 20 are moved linearly and in an inclined manner and then is moved in a curved manner about the second and third hinge axes A2 and A3, the body housing 10 and the folder 20 are located in an H-shape.

In this state, a user uses a key pad provided in the body housing his or her both hands to use the portable terminal for a game or another function.

Here, as shown in FIG. 17, the body housing 10 and the folder 20 are rotated from the transverse direction to the longitudinal direction to place the folder in the original position.

Figure 22:
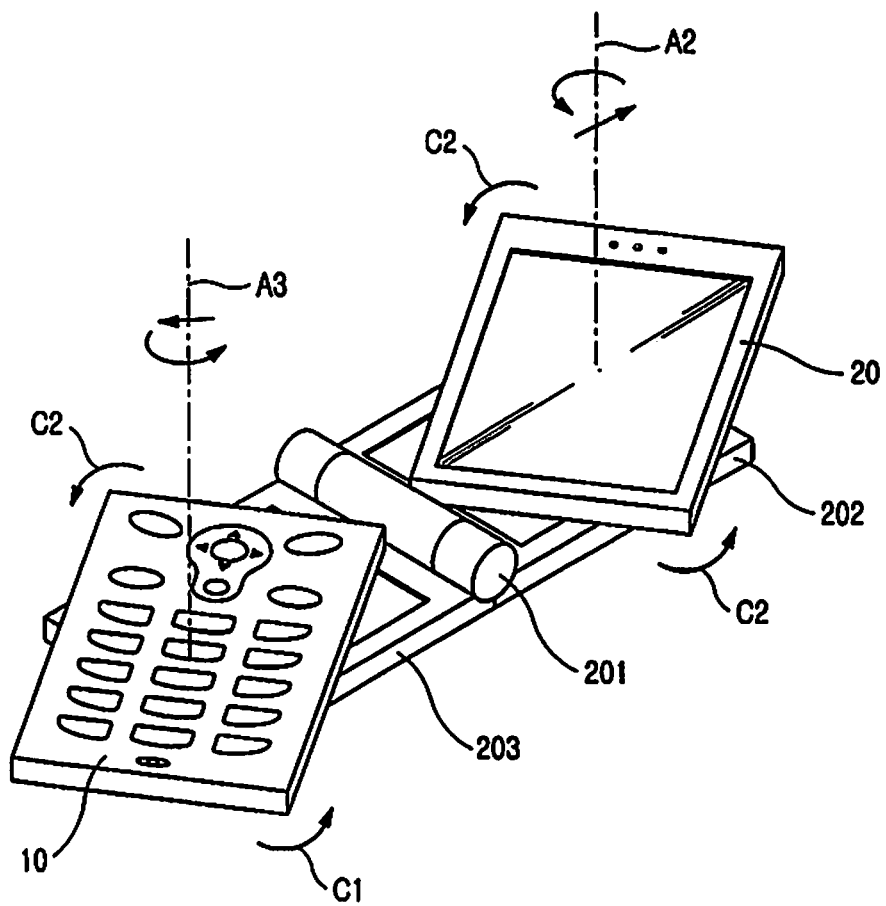
FIG. 22 is a perspective view of a process for rotating the body housing and the folder in the counter-clockwise direction in the dual hinge apparatus of the portable terminal according to the second embodiment of the present invention.
Figure 23:
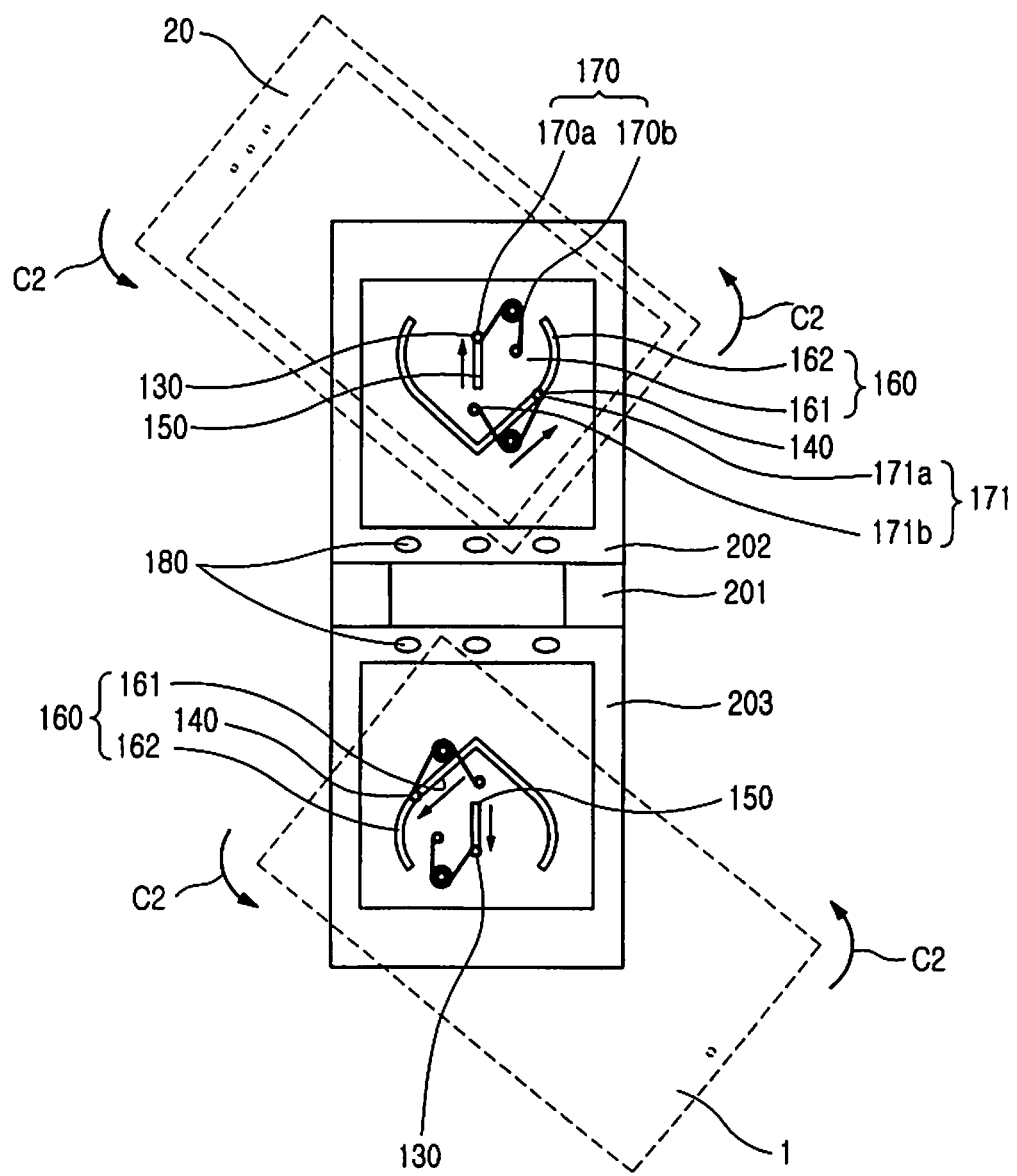
FIG. 23 is a front view of the process for rotating the body housing and the folder in the counter-clockwise direction in the dual hinge apparatus of the portable terminal according to the second embodiment of the present invention.
Figure 24:
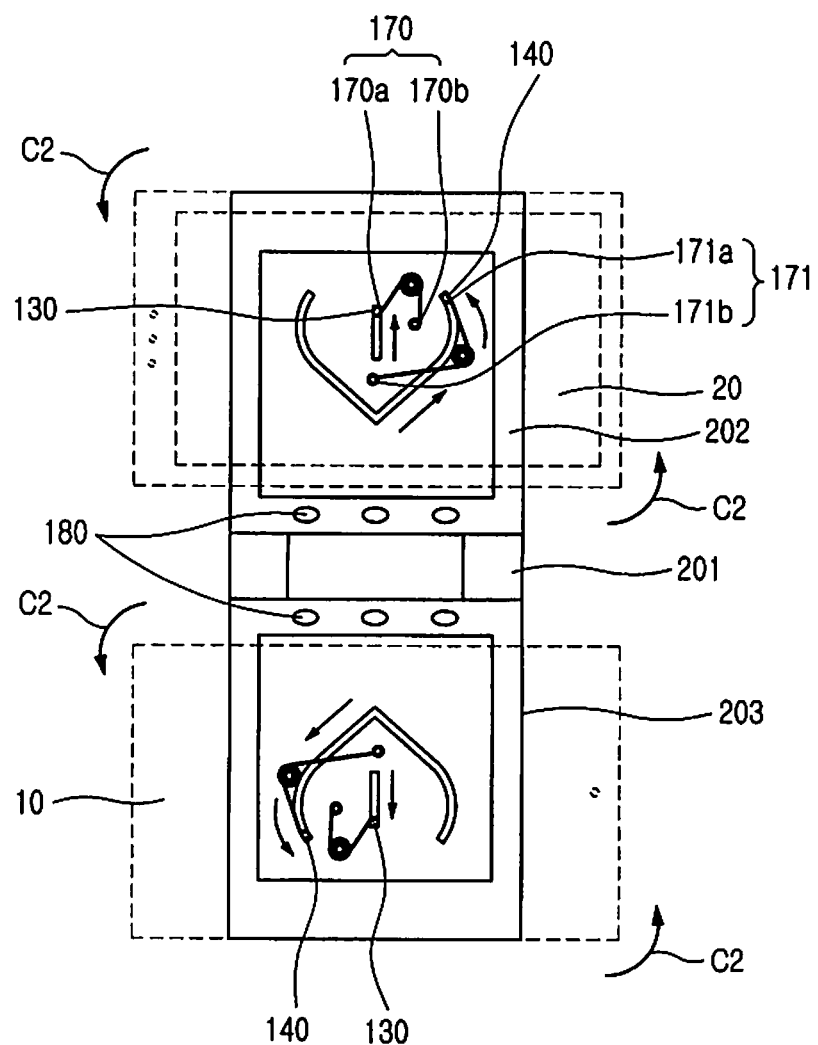
FIG. 24 is a front view of the dual hinge apparatus of the portable terminal according to the second embodiment of the present invention, with the body housing and the folder being rotated by 90 degrees in the counter-clockwise direction.

As shown in FIGS. 22, 23, and 24, the folder 20 and the body housing 10, located in their original positions, are rotated about the second and third hinge axes A2 and A3, respectively, in the counter-clockwise direction C2 from the longitudinal direction to the transverse direction.

Then, as shown in FIG. 23, the first guide pins 130 are guided and moved linearly along the first guide holes 150 and the second guide pins 140 are moved in an inclined manner along the inclined guide sections 161 of the second guide holes 160 and are guided and moved in a curved manner along the curved guide sections 162 extending from the inclined guide sections 161.

Then, as shown in FIG. 24, the body housing 10 and the folder 20 are rotated by 90 degrees in the counter-clockwise direction C2 to be located transversely.

Then, all of the exposed operation mode keys 180 are closed.

Then, as shown in FIGS. 23 and 24, the first and second resilient members 170 and 171 provide resilient forces so that the first and second guide pins 130 and 140 can be moved linearly or in an inclined manner and then in a curved manner along the first and second guide holes 150 and 160.

As mentioned above, since the folder 20 and the body housing 10 can be rotated to the both directions, i.e. to the right and to the left, a user can conveniently use the portable terminal regardless of whether the user is right handed or left handed.

Hereinafter, the operation of a rotation hinge apparatus of a swing-type portable terminal according to the third embodiment of the present invention will be described in detail with reference to FIGS. 25 to 26.

Figure 25:
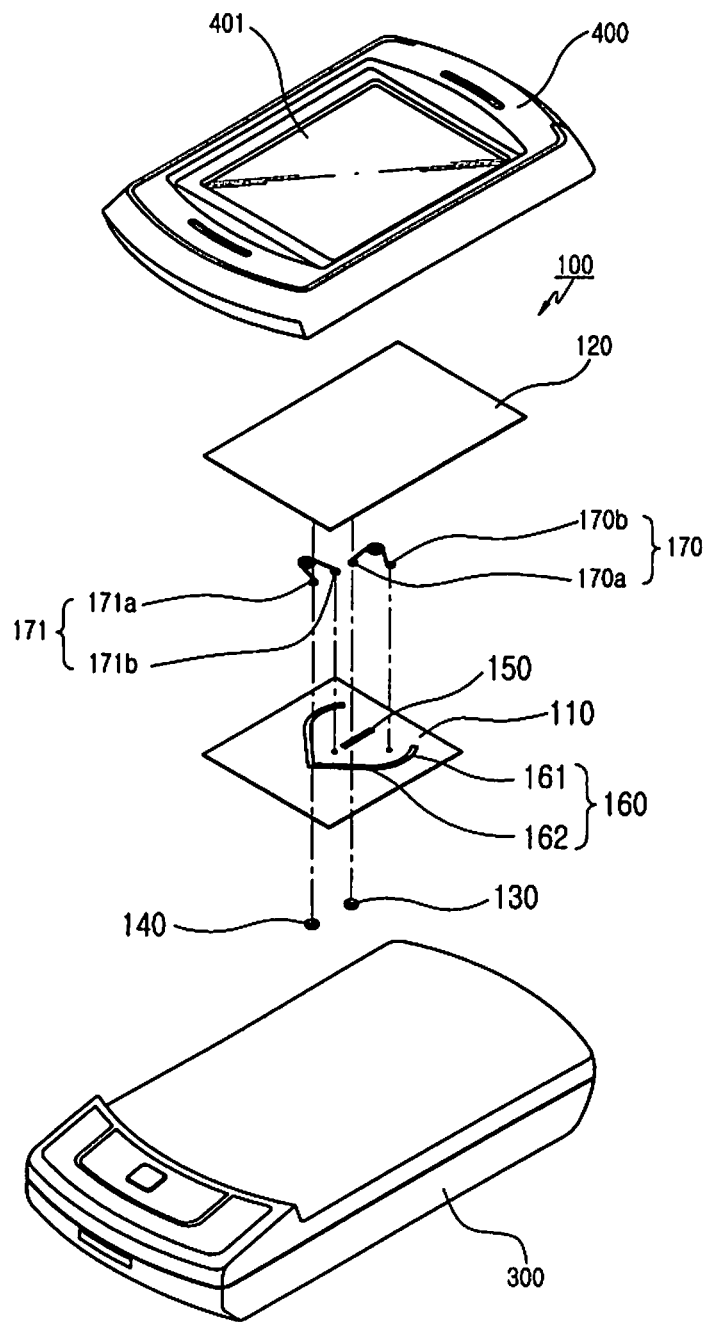
FIG. 25 is an exploded perspective view of a rotation hinge apparatus of a swing-type portable terminal according to the third embodiment of the present invention.

As shown in FIG. 25, the swing-type portable terminal includes a body housing 300 and a swing housing 400, including a liquid crystal display section 401 and rotating on the upper surface of the body housing 300, facing the body housing 300.

As shown in FIG. 25, a rotation hinge apparatus 100 of the swing-type portable terminal includes a base member 110, a rotation member 120, first and second guide pins 130 and 140, first and second guide sections 150 and 160, and a force supplying means.

The first and second guide pins 130 and 140 penetrate first and second guide sections 150 and 160 provided in the base member 110 to be engaged with the rotation member 120.

The first and second guide sections 150 and 160 include first and second guide holes.

Then, the first and second guide sections 150 and 160 are provided with the force supplying means. The force supplying means include first and second resilient members 170 and 171. One end 170a of the first resilient member 170 is engaged with the first guide pin 130 and the other end 170b thereof is engaged with the base member 110. One end 171a of the second resilient member 171 is engaged with the second guide pin 140 and the other end 171b thereof is engaged with the base member 110.

In this state, the base member 110 is engaged with the body housing 300 and the rotation member 120 is engaged with the swing housing 400.

The swing housing 400 is rotated along a clockwise direction C1 (FIG. 26) from the longitudinal direction to the transverse direction.

Then, the first guide pin 130 is guided and moved linearly along the first guide hole 150, and the second guide pin 140 is moved in an inclined manner along an inclined guide section 161 of the second guide hole 160 and is guided and moved in a curved manner along a curved guide section 162 extending from the inclined guide section 161.

Figure 26:
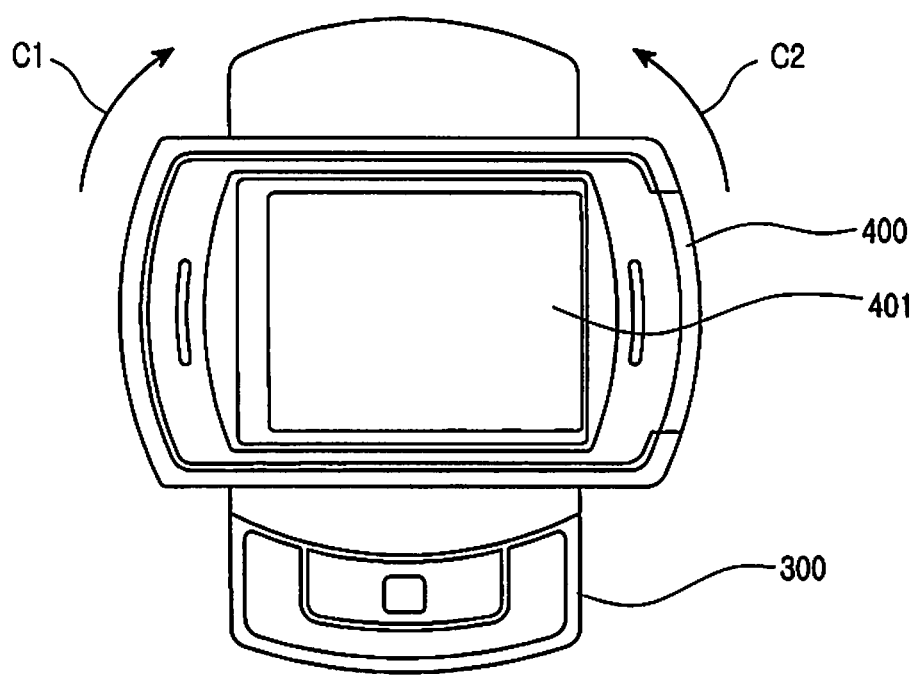
FIG. 26 is a front view of processes for rotating the rotation hinge apparatus of the swing-type portable terminal according to the third embodiment of the present invention in the clockwise and counter-clockwise directions.

As shown in FIG. 26, the swing housing 400 is rotated by 90 degrees in the clockwise direction C1 to be located transversely.

Then, the first and second resilient members 170 and 171 provide resilient forces so that the first and second guide pins 130 and 140 can be moved linearly or in an inclined manner and then in a curved manner along the first and second guide holes 150 and 160. The first and second resilient members 170 and 171 are moved together with the second guide pin 140 along a predetermined locus as the second guide pin 140 is moved in an inclined manner and then is moved in a curved manner.

In this state, as shown in FIG. 26, the swing housing 400 is rotated reversely to be located in the original position.

The swing housing 400 located in the original position is rotated in the counter-clockwise direction C2 from the longitudinal direction to the transverse direction.

Then, the first guide pin 130 is guided and moved linearly along the first guide hole 150, and the second guide pin 140 is moved in an inclined manner along the inclined guide section 161 of the second guide hole 160 and is guided and moved in a curved manner along the curved guide section 162 extending from the inclined guide section 161 (FIG. 25).

As shown in FIG. 26, the swing housing 400 is rotated by 90 degrees in the counter-clockwise direction C2 to be located longitudinally.

Then, the first and second resilient members 170 and 171 provide resilient forces so that the first and second guide pins 130 and 140 can be moved linearly or in an inclined manner along the first and second guide holes 150 and 160, and then are guided and moved in a curved manner. The first and second resilient members 170 and 171 are moved together with the second guide pin 140 along a predetermined locus as the second guide pin 140 is moved in an inclined manner and then in a curved manner (FIG. 25).

As mentioned above, since the swing housing 400 can be rotated in both directions, i.e. to the right and to the left, a user can conveniently use the portable terminal regardless of whether the user is right handed or left handed.

Hereinafter, the operation of a rotation hinge apparatus of a slide/swing-type portable terminal according to the fourth embodiment of the present invention will be described in detail with reference to FIGS. 27 to 28.

Figure 27:
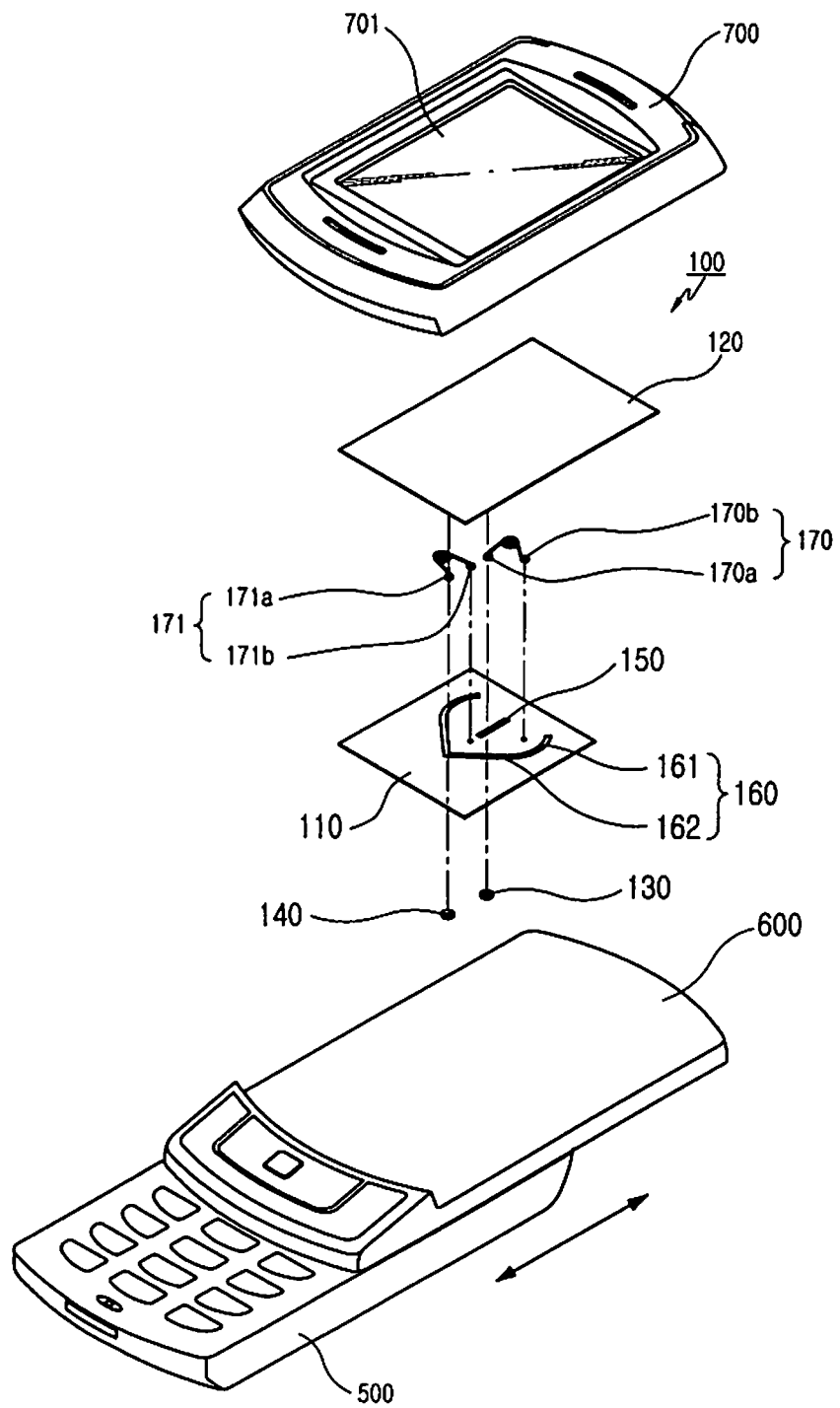
FIG. 27 is an exploded perspective view of a rotation hinge apparatus of a sliding/rotation-type portable terminal according to the fourth embodiment of the present invention.

As shown in FIG. 27, the sliding/rotation-type portable terminal includes a body housing 500 and a folder 700, including a slide housing 600 and a liquid crystal display section 701, and rotating on the upper surface of the slide housing 600, facing the slide housing 600.

Figure 28:
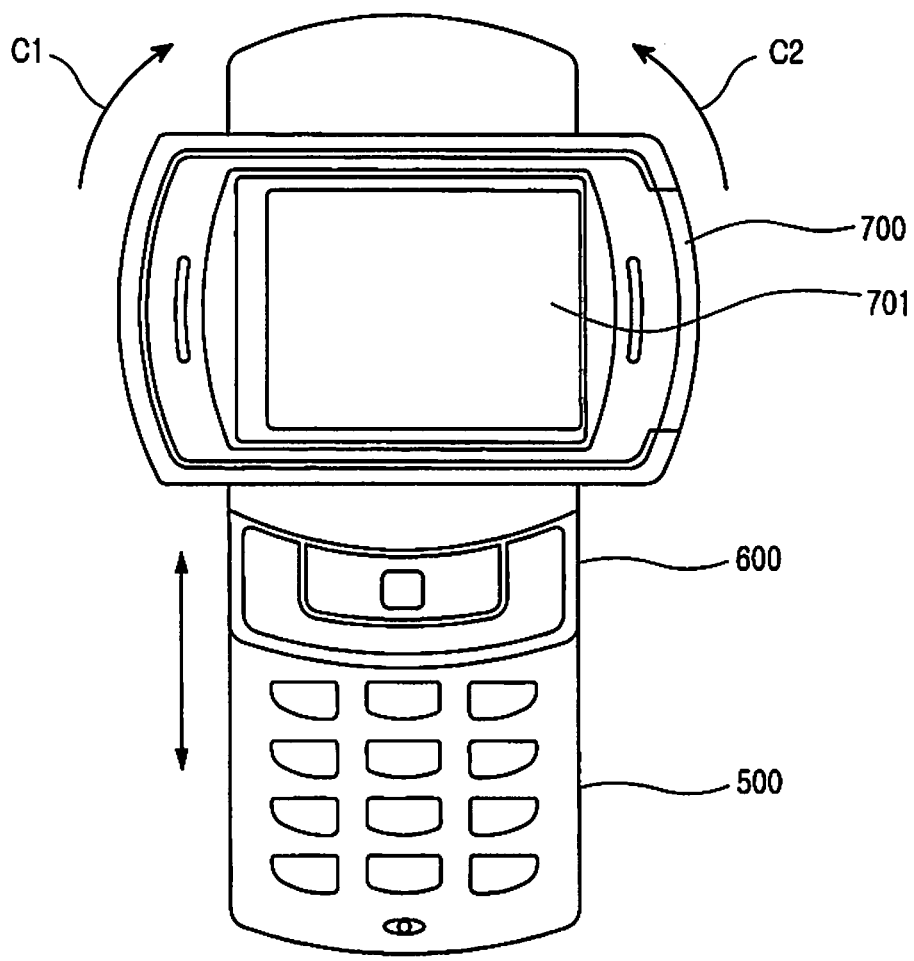
FIG. 28 is a front view of processes for rotating the rotation hinge apparatus of the sliding/rotation-type portable terminal according to the fourth embodiment of the present invention in the clockwise and counter-clockwise directions.

As shown in FIGS. 27 and 28, the rotation hinge apparatus 100 of the sliding/rotation-type portable terminal includes a base member 110, a rotation member 120, first and second guide pins 130 and 140, first and second guide sections 150 and 160, and a force supplying means.

The first and second guide pins 130 and 140 penetrate first and second guide sections 150 and 160 provided in the base member 110 to be engaged with the rotation member 120.

The first and second guide sections 150 and 150 include first and second guide holes.

Then, the first and second guide sections 150 and 160 are provided with the force supplying means. The force supplying means include first and second resilient members 170 and 171. One end 170a of the first resilient member 170 is engaged with the first guide pin 130, and the other end 170b thereof is engaged with the base member 110. One end 171a of the second resilient member 171 is engaged with the second guide pin 140, and the other end 171b thereof is engaged with the base member 110.

In this state, as shown in FIG. 27, the base member 110 is engaged with the body housing 300, and the rotation member 120 is engaged with the folder 700.

As shown in FIG. 28, the folder 700 is rotated along a clockwise direction C1 from the longitudinal direction to the transverse direction.

Then, the first guide pin 130 is guided and moved linearly along the first guide hole 150, and the second guide pin 140 is moved in an inclined manner along an inclined guide section 161 of the second guide hole 160 and is guided and moved in a curved manner along the curved guide section 162 extending from the inclined guide section 161 (FIG. 27).

As shown in FIG. 28, the folder is rotated by 90 degrees in the clockwise direction C1 to be located transversely.

Then, the first and second resilient members 170 and 171 provide resilient forces so that the first and second guide pins 130 and 140 can be moved linearly or in an inclined manner and then in a curved manner along the first and second guide holes 150 and 160 (FIG. 27). The first and second resilient members 170 and 171 are moved together with the second guide pin 140 along a predetermined locus as the second guide pin 140 is moved in an inclined manner and then is moved in a curved manner.

In this state, as shown in FIG. 28, the folder 700 is rotated reversely to be located in the original position. The folder 700 located in the original position is rotated in the counter-clockwise direction C2 from the longitudinal direction to the transverse direction.

Then, the first guide pin 130 is guided and moved linearly along the first guide hole 150, and the second guide pin 140 is moved in an inclined manner along an inclined guide section 161 of the second guide hole 160 and is guided and moved in a curved manner along a curved guide section 162 extending from the inclined guide section 161.

As shown in FIG. 28, the folder 700 is rotated by 90 degrees in the counter-clockwise direction C2 to be located longitudinally.

Then, the first and second resilient members 170 and 171 provide resilient forces so that the first and second guide pins 130 and 140 can be moved linearly or in an inclined manner along the first and second guide holes 150 and 160 and then is guided and moved in a curved manner (FIG. 27). The first and second resilient members 170 and 171 are moved together with the second guide pin 140 along a predetermined locus as the second guide pin 140 is moved in an inclined manner and then in a curved manner.

As mentioned above, since the folder 700 can be rotated to the both directions, i.e. to the right and to the left, a user can conveniently use the portable terminal regardless of whether the user is right handed or left handed (FIG. 28).

The rotation hinge apparatus of the portable terminal of the present invention is not limited to the embodiments and the drawings. It will be understood by those skilled in the art that various changes in form and details may be made therein without departing from the spirit and scope of the invention as defined by the appended claims.

What is claimed is:

1. A rotation hinge apparatus of a portable terminal including a body housing, a folder including a liquid crystal display section and rotated in the body housing about first and second axes, and a connection member rotatably connecting the folder about the first and second hinge axes, the rotation hinge apparatus comprising:
a base member;
a rotation member;
first and second guide pins provided in the rotation member;
first and second guide sections provided in the base member, the first and second guide sections engaged with the first and second guide pins to locate the liquid crystal display section of the folder at the center of the connection member by guiding linear movement of the first guide pin when the rotation member is rotated about the second hinge axis in the clockwise or counter-clockwise direction and by moving the second guide pin in an inclined manner and then in a curved manner and guiding and moving the second hinge axis in an inclined manner and then in a curved manner; and
at least one force supplying means provided between the first and second guide sections and providing a force for moving the first and second guide pins linearly or in an inclined manner and then in a curved manner,
wherein the rotation member is rotatable in the clockwise direction to be located transversely and the rotation member is rotatable in the counterclockwise direction to be located transversely.

2. The rotation hinge apparatus according to claim 1, wherein the base member is engaged with the connection member and the rotation member is engaged with the folder.

3. The rotation hinge apparatus according to claim 1, wherein the first guide section includes a first guide hole for penetration by the first guide pin, the first guide hole being linearly provided along the lengthwise direction of the folder, a first stopper section being formed at one end of the first guide hole so as to make contact with the first guide pin to stop the linear movement of the first guide pin at a rotation stopping position of the folder, a second stopper section being formed at the other end of the first guide hole so as to make contact with the first guide pin to stop the folder, with the folder being rotated by 90 degrees.

4. The rotation hinge apparatus according to claim 1, wherein the second guide section includes a second guide hole for penetration by the second guide pin, the second guide hole having an inclined guide section guiding and moving the second guide pin in an inclined manner if the folder is rotated in the counter-clockwise or clockwise direction and a curved guide section extending from the inclined guide section in a movement direction and guiding and moving the second guide pin in a curved manner after the second guide pin is guided and moved along the inclined guide section.

5. The rotation hinge apparatus according to claim 4, wherein the second guide hole is substantially V-shaped.

6. The rotation hinge apparatus according to claim 4, wherein a first stopper section is formed at one end of the inclined guide section so as to make contact with the second guide pin to stop the second guide pin at a rotation stopping position of the folder, and a second stopper section is formed at one end of the curved guide section so as to make contact with the second guide pin to stop the second guide pin, with the folder being rotated by 90 degrees.

7. The rotation hinge apparatus according to claim 1, wherein the force supplying means includes first and second resilient members, one end of the first resilient member being engaged with the first guide pin and the other end thereof being engaged with the base member so that the resilient member can be moved together with the first guide pin along a predetermined locus as the first guide pin is moved linearly, one end of the second resilient member being engaged with the second guide pin and the other end thereof being engaged with the base member so that the second resilient member can be moved together with the second guide pin along a predetermined locus as the second guide pin is moved in an inclined manner or in a curved manner.

8. The rotation hinge apparatus according to claim 1, wherein at least one operation mode key opened and closed as the folder is rotated about the second hinge axis is provided on the inner surface of the connection member.

9. The rotation hinge apparatus according to claim 8, wherein the operation mode key includes a Digital Multimedia Broadcasting (DMB) dedicated key.

10. A dual hinge apparatus of a portable terminal including a body housing, a folder including a liquid crystal display section and rotated in the body housing about first, second, and third axes, and a dual connection member providing the first, second, and third hinge axes and rotatably connecting the folder about the first, second, and third hinge axes, the dual hinge apparatus comprising:

base members;

rotation members;

first and second guide pins provided in the rotation members;

first and second guide sections provided in the base members, the first and second guide sections engaged with the first and second guide pins to place the body housing and the folder at the centers of the dual connection members by guiding linear movements of the first guide pins when the rotation members are rotated about the second and third hinge axes in the clockwise and counter-clockwise directions and by guiding and moving the second guide pins in an inclined manner and then in a curved manner and guiding and moving the second and third hinge axes in an inclined manner and then in a curved manner; and at least one force supplying means provided between the first and second guide sections and providing forces for moving the first and second guide pins linearly or in an inclined manner and then in a curved manner, wherein the rotation members are rotatable in the clockwise direction to be located transversely and the rotation members are rotatable in the counterclockwise direction to be located transversely.

11. The dual hinge apparatus according to claim 10, wherein the dual connection members are connected to the base members and the body housing and the folder are engaged with the rotation members.

12. The dual hinge apparatus according to claim 10, wherein the dual hinge member includes first, second, and third connection members, the first connection member providing the first hinge axis and rotatably connecting the folder to the body housing, the second connection member providing the second hinge axis and rotating the second hinge axis of the folder by 90 degrees by moving the first guide pin linearly by the first guide section and moving the second guide pin in an inclined manner and then in a curved manner by the second guide section if the folder is rotated about the second hinge axis in the clockwise or counter-clockwise direction, the third connection member providing the third hinge axis and rotating the third hinge axis of the body housing by 90 degrees by moving the first guide pin linearly by the first guide section and moving the second guide pin in an inclined manner and then in a curved manner by the second guide section if the body housing is rotated about the third hinge axis in the clockwise or counter-clockwise direction.

13. The dual hinge apparatus according to claim 10, wherein if the body housing and the folder are moved linearly and in an inclined manner and then is moved in a curved manner about the second and third hinge axes, the body housing and the folder are located in an H-shape.

14. The dual hinge apparatus according to claim 10, wherein at least one operation mode key opened and closed as the folder is rotated about the second hinge axis is provided on the inner surface of the connection member.

15. The dual hinge apparatus according to claim 14, wherein the operation mode key includes a digital multimedia broadcasting (DMB) dedicated key.

16. A rotation hinge apparatus of a swing-type portable terminal including a body housing and a swing housing including a liquid crystal display section and rotated on the upper surface, facing the body housing, the rotation hinge apparatus comprising:

a base member;

a rotation member;

first and second guide pins provided in the rotation member;

first and second guide sections provided in the base member, the first and second guide sections engaged with the first and second guide pins to place the liquid crystal display section of the swing housing at the center of the body housing by guiding linear movement of the first guide pin when the rotation member is rotated about the second hinge axis in the clockwise or counter-clockwise direction and by moving the second guide pin in an inclined manner and then in a curved manner, and guiding and moving the second hinge axis in an inclined manner and then in a curved manner; and at least one force supplying means provided between the first and second guide sections and providing a force for moving the first and second guide pins linearly or in an inclined manner and then in a curved manner, wherein the rotation member is rotatable in the clockwise direction to be located transversely and the rotation member is rotatable in the counterclockwise direction to be located transversely.

17. The rotation hinge apparatus according to claim 16, wherein the base member is engaged with the connection member and the rotation member is engaged with the swing housing.

18. A rotation hinge apparatus of a sliding/rotation-type portable terminal including a body housing, a slide housing opened and closed by sliding the sliding housing from the body housing, and a folder including a liquid crystal display section and rotated about a hinge axis in the slide housing, the sliding/rotation hinge apparatus comprising:

a base member;

a rotation member;

first and second guide pins provided in the rotation member;

first and second guide sections provided in the base member, the first and second guide sections engaged with the first and second guide pins to place the liquid crystal display section of the folder at the center of the body housing by guiding linear movement of the first guide pin when the rotation member is rotated about the second hinge axis in the clockwise or counter-clockwise direction and by moving the second guide pin in an inclined manner and then in a curved manner, and guiding and moving the second hinge axis in an inclined manner and then in a curved manner; and at least one force supplying means provided between the first and second guide sections and providing a force for moving the first and second guide pins linearly or in an inclined manner and then in a curved manner, wherein the rotation member is rotatable in the clockwise direction to be located transversely and the rotation member is rotatable in the counterclockwise direction to be located transversely.

19. The rotation hinge apparatus according to claim 18, wherein the base member is engaged with the slide member and the rotation member is engaged with the folder.

20. A rotation hinge apparatus of a portable terminal including a body housing and a folder including a liquid crystal display section and rotated about first and second hinge axes in the body housing, the rotation hinge apparatus comprising:

a base member;

a rotation member;

first and second guide pins provided in the rotation member;

first and second guide sections provided in the base member, the first and second guide sections engaged with the first and second guide pins to place the liquid crystal display section of the folder at the center of the body housing by guiding linear movement of the first guide pin when the rotation member is rotated about the second hinge axis in the clockwise or counter-clockwise direction and by moving the second guide pin in an inclined manner and then in a curved manner, and guiding and moving the second hinge axis in an inclined manner and then in a curved manner; and at least one force supplying means provided between the first and second guide sections and providing a force for moving the first and second guide pins linearly or in an inclined manner and then in a curved manner, wherein the rotation member is rotatable in the clockwise direction to be located transversely and the rotation member is rotatable in the counterclockwise direction to be located transversely.

* * * * *